United States Patent
Takeda

(10) Patent No.: US 10,293,444 B2
(45) Date of Patent: May 21, 2019

(54) WORKPIECE CONVEYING APPARATUS FOR A PRESSING MACHINE

(71) Applicant: AIDA ENGINEERING, LTD., Kanagawa (JP)

(72) Inventor: Keisuke Takeda, Kanagawa (JP)

(73) Assignee: AIDA ENGINEERING, LTD., Kanagawa (JP)

(*) Notice: Subject to any disclaimer, the term of this patent is extended or adjusted under 35 U.S.C. 154(b) by 0 days.

(21) Appl. No.: 16/001,573

(22) Filed: Jun. 6, 2018

(65) Prior Publication Data

US 2018/0361521 A1    Dec. 20, 2018

(30) Foreign Application Priority Data

Jun. 14, 2017  (JP) ................. 2017-116433

(51) Int. Cl.
| | |
|---|---|
| B65G 47/14 | (2006.01) |
| B65G 47/91 | (2006.01) |
| B25J 17/02 | (2006.01) |
| B23Q 7/04 | (2006.01) |
| B25J 9/04 | (2006.01) |
| B25J 15/00 | (2006.01) |
| B23Q 7/14 | (2006.01) |

(52) U.S. Cl.
CPC .......... *B23Q 7/043* (2013.01); *B23Q 7/1405* (2013.01); *B25J 9/042* (2013.01); *B25J 15/00* (2013.01);
(Continued)

(58) Field of Classification Search
CPC .. B65G 47/00; B65G 47/1485; B65G 47/914; B65G 47/918; B65G 47/915;
(Continued)

(56) References Cited

U.S. PATENT DOCUMENTS 5,492,443 A * 2/1996 Crorey ................. B65G 47/914
                                                                212/224
5,681,138 A * 10/1997 Lust ...................... B29C 31/006
                                                                198/409
(Continued)

FOREIGN PATENT DOCUMENTS

EP    0180565 A1    5/1986
EP    2990135 A2    3/2016
(Continued)

OTHER PUBLICATIONS

Extended European Search Report issued in Europen Paten Application No. 18177681, dated Nov. 14, 2018.

*Primary Examiner* — James R Bidwell
(74) *Attorney, Agent, or Firm* — McDermott Will & Emery LLP

(57) ABSTRACT

A workpiece conveying apparatus for a pressing machine includes: a first arm supported so as to be rotatable within a substantially horizontal plane; a second arm supported on the first arm so as to be rotatable within the substantially horizontal plane; a workpiece holding device supported on a distal end side of the second arm so as to be rotatable within the substantially horizontal plane; a first arm drive mechanism configured to drive the first arm to rotate; a second arm drive mechanism configured to drive the second arm to rotate with respect to the first arm; a workpiece holding device rotation drive mechanism configured to drive the workpiece holding device to rotate with respect to the second arm; and a tilt drive mechanism configured to drive the workpiece holding device to rotate with respect to the second arm.

4 Claims, 19 Drawing Sheets

(52) U.S. Cl.
CPC ...... *B25J 17/0258* (2013.01); *B65G 47/1485* (2013.01); *B65G 47/914* (2013.01)

(58) Field of Classification Search
CPC ... B65G 47/91; B25J 17/00; B25J 9/06; B25J 17/02; B25J 17/0258
USPC .............................. 198/468.4, 468.2, 468.9
See application file for complete search history.

(56) References Cited

U.S. PATENT DOCUMENTS

| | | | | |
|---|---|---|---|---|
| 6,185,815 | B1* | 2/2001 | Schindler | H01L 21/67144 198/468.4 |
| 8,863,685 | B2* | 10/2014 | Mori | B28B 11/007 118/317 |
| 9,010,520 | B2* | 4/2015 | Felgenhauer | C03B 9/165 198/468.4 |
| 2005/0178641 | A1* | 8/2005 | Yoshida | B23Q 1/5468 198/468.4 |
| 2012/0107081 | A1* | 5/2012 | Furuta | B65G 47/918 414/752.1 |
| 2018/0222038 | A1* | 8/2018 | Maeno | B25J 5/02 |

FOREIGN PATENT DOCUMENTS

| | | | |
|---|---|---|---|
| JP | H07-116984 | A | 5/1995 |
| JP | H07-308876 | A | 11/1995 |
| JP | 2003-135539 | A | 5/2003 |
| JP | 2009-095940 | A | 5/2009 |
| JP | 4545996 | B2 | 9/2010 |
| WO | 97/35241 | A1 | 9/1997 |

* cited by examiner

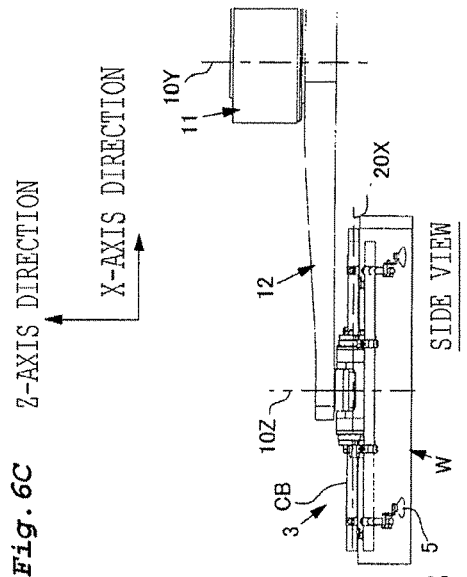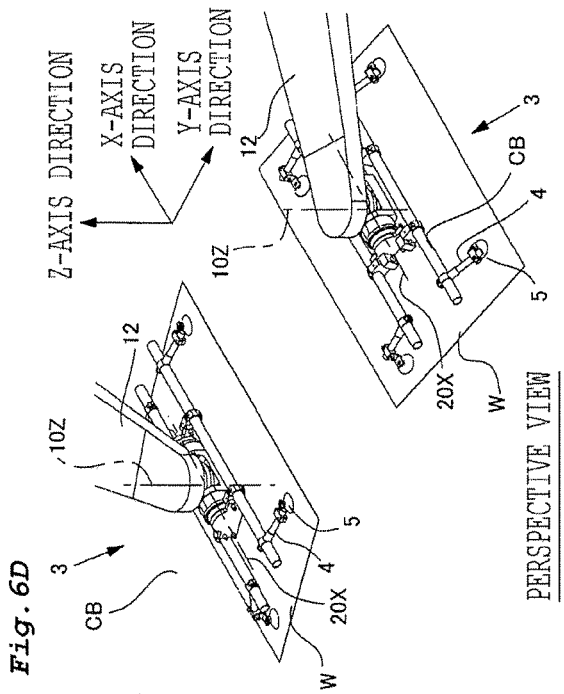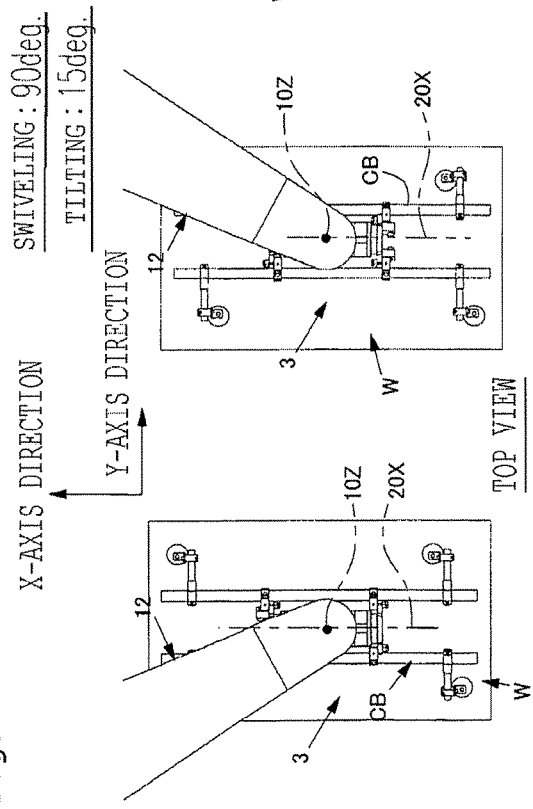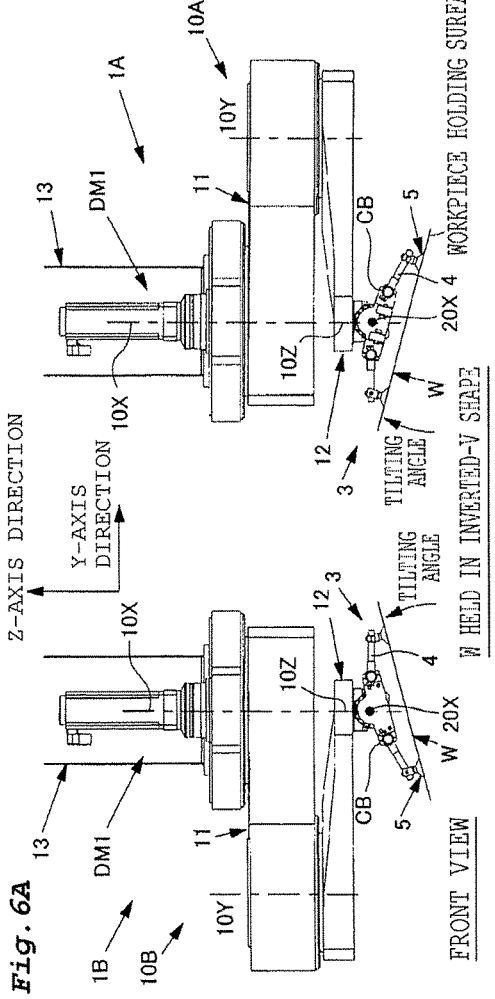

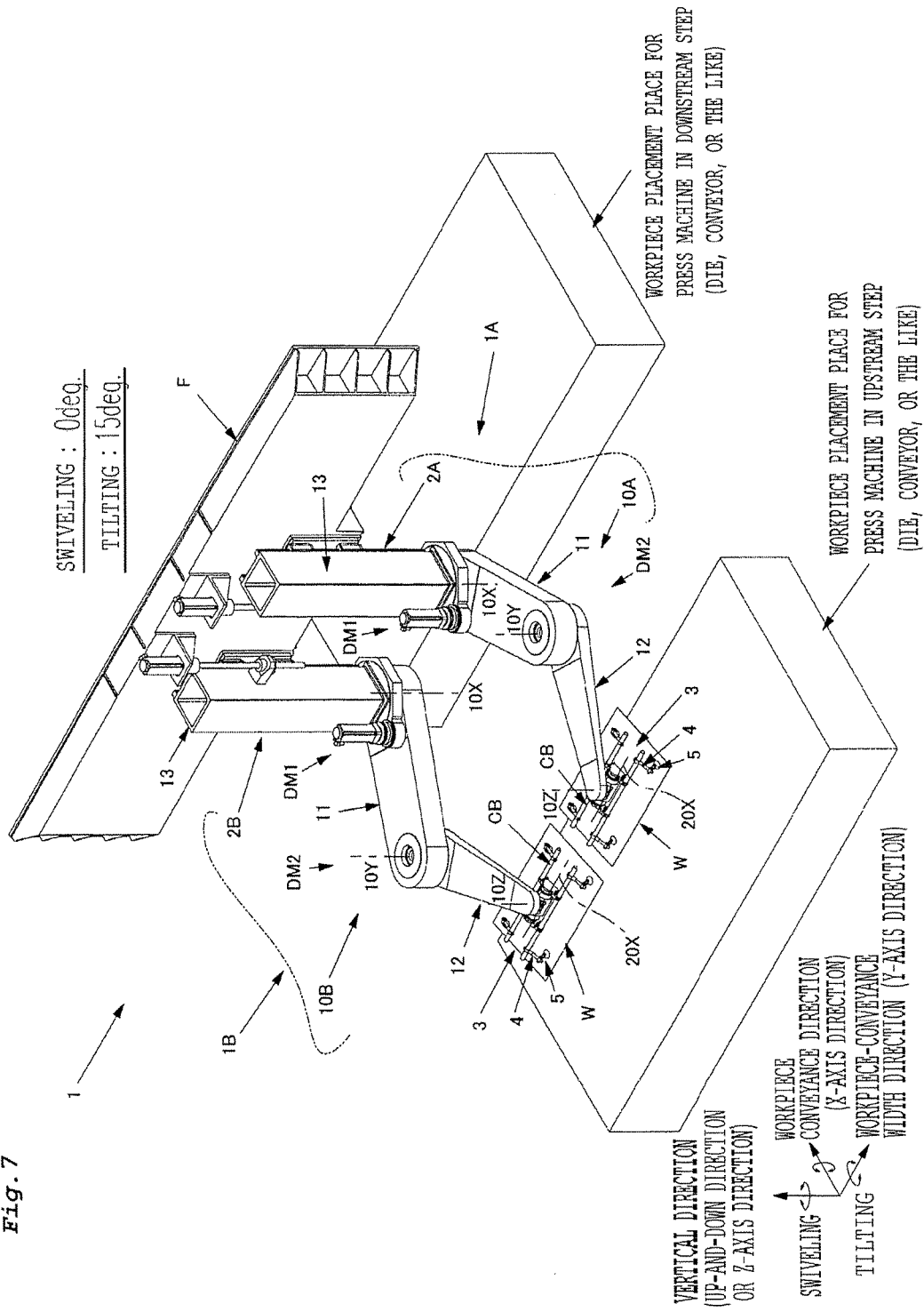

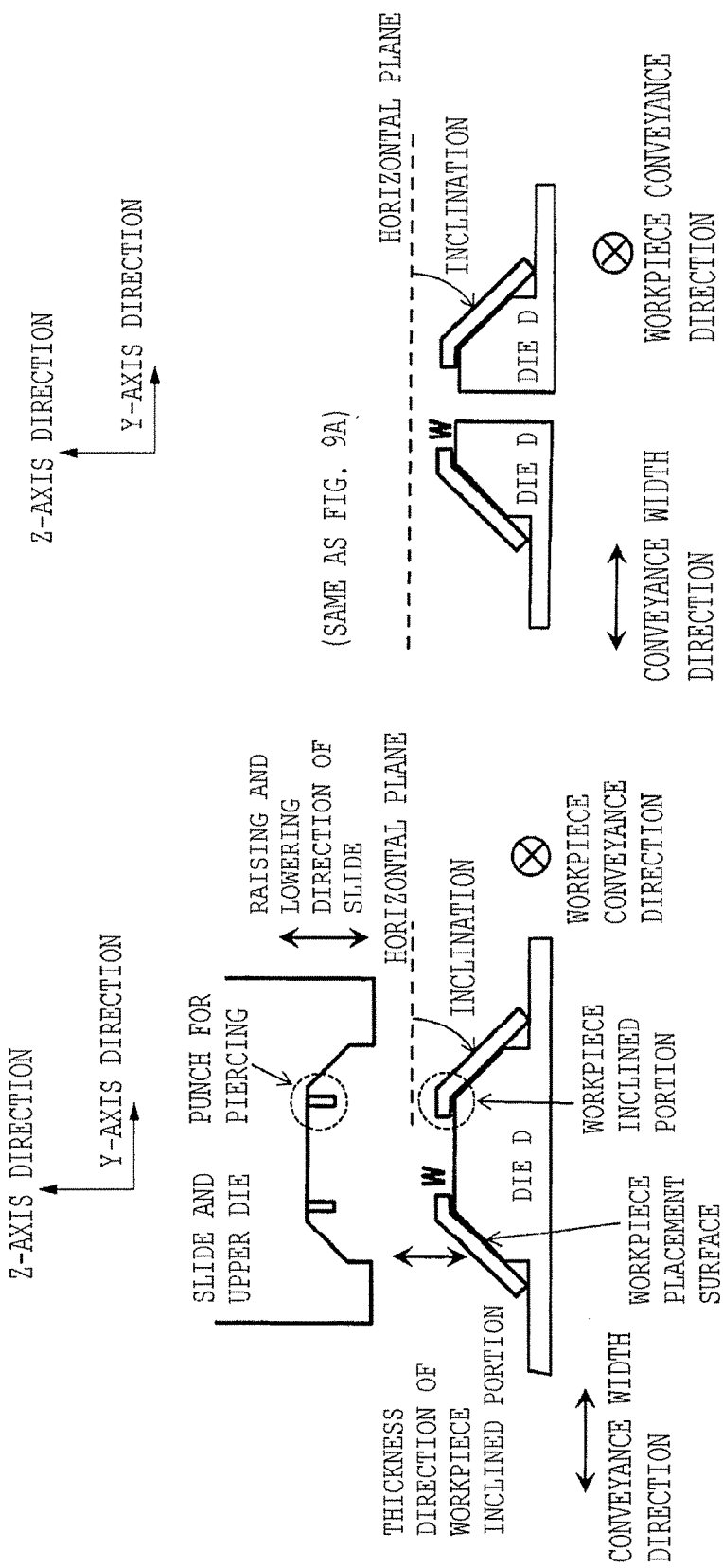

[EOL IN RELATED ART]

WORKPIECE CONVEYING APPARATUS FOR A PRESSING MACHINE

BACKGROUND OF THE INVENTION

Field of the Invention

The present invention relates to a workpiece conveying apparatus for a pressing machine (press machine).

Background

There is a case in which, for example, in order to enhance a production efficiency of a tandem press line including a plurality of pressing machines arrayed in a workpiece conveyance direction, a plurality of workpieces W are conveyed in parallel at high speed so as to simultaneously perform press working on the plurality of workpieces W.

With regard to such operation, the following cases are assumed. In one case, one die D is installed in one pressing machine, and two or four workpieces W are set in the one die D (see FIG. 18A). In another case, two dies D (D1 and D2) are installed in one pressing machine, and one or two workpieces W are set in each of the dies D (D1 and D2) (see FIG. 18(B)).

A horizontal articulated workpiece conveying apparatus is suitable for high speed conveyance of a workpiece for press working, and there is given, for example, an apparatus disclosed in Patent Literature 1.

In the disclosed apparatus, the following configuration is employed. Specifically, a SCARA robot (horizontal articulated robot) including an arm that is swingable about a vertical axis (that is, swingable within a horizontal plane) is provided. A workpiece is held at a distal end of the arm so as to be releasable, and the workpiece is conveyed by a swinging motion of the arm within the horizontal plane.

The SCARA robot is utilized in the workpiece conveyance because of the following actual circumstances. A workpiece for press working has relatively large weight. Thus, when a vertical articulated robot including a joint that is pivotable in the gravity direction (up-and-down direction) is used, the joint part thereof needs to have a high rigidity to support the weight of the arm and the workpiece on the distal end side. Thus, the volume as well as the weight are increased. Further, insufficiency in rigidity of the joint itself causes increase in vibration or the like along with the increase in speed. Therefore, there is a limitation to high speed conveyance.

Herein, Patent Literature 1 corresponds to Japanese Patent Application Laid-open No. 2009-095940.

In a process of stepwisely performing press working on the above-mentioned plurality of workpieces W in the tandem press line, the inclined portions (or bent portions) are formed on the workpieces in many cases (see the uppermost part of FIG. 19).

There is assumed a case in which an opening is formed in such inclined portion through a piercing process (hole forming process by a press machine using a punch and a die).

In such case, it is desired that the opening be formed (piercing formation) along a thickness direction of the inclined portion (that is, cause the opening to be orthogonal to a surface of the plate) for the purpose of avoiding poor external appearance, and suppressing an adverse influence on assembly steps of products (see the lowermost part of FIG. 19).

When the horizontal articulated workpiece conveying apparatus (SCARA robot) as described in Patent Literature 1 is used, the movement of the arm is limited to rotation (pivot or swing) about the workpiece vertical axis within a certain range (within the substantially horizontal plane). Thus, in order to stably set the workpiece in the die, it is desired that a workpiece placement surface of the die be set substantially horizontal so as to correspond to a holding posture of the workpiece.

However, in view of achieving the above-mentioned configuration, there is the following actual circumstance. In order to form the opening along the thickness direction of the inclined portion, it is required to provide a structure, in which the punch for piercing advances obliquely with respect to a raising and lowering direction of a slide along with press working, in the die utilizing a cam or the like.

In this case, the internal structure of the die itself may be complicated, which may result in increase in production cost. In addition, there is an actual circumstance in which, when this structure is to be adopted to the plurality of workpieces being conveyed in parallel, the die structure may further be complicated.

Meanwhile, it is not desirable to perform piercing formation on the inclined portion along the raising and lowering direction of the slide (that is, obliquely with respect to the thickness direction of the inclined portion of the workpiece) from the standpoint of poor external appearance and influence on a subsequent step as mentioned above (see the middle part of FIG. 19).

Further, when the above-mentioned inclined portion is formed, the distal end side of the inclined portion extends downward. Therefore, when the workpiece is released from a state in which the horizontal part of the workpiece is held in a horizontal posture by the workpiece holding device (drawing cup or the like), and is placed in a horizontal place, the distal end side of the inclined portion is first brought into contact with the horizontal place, and then a portion held by the workpiece holding device falls out. Consequently, the workpiece is undesirably moved due to the falling to increase vibration noise. Further, the workpiece cannot be accurately placed at a certain position. That is, there is an actual circumstance in which the formation of the inclined portion becomes a factor of inhibiting achievement of high-speed conveyance of the workpiece.

SUMMARY OF THE INVENTION

According to one embodiment of the present invention, there is provided a workpiece conveying apparatus for a pressing machine, including: a first arm supported at a proximal end side thereof through intermediation of a first joint so as to be freely rotatable within a substantially horizontal plane; a second arm supported at a proximal end side thereof on a distal end side of the first arm through intermediation of a second joint so as to be freely rotatable within the substantially horizontal plane; a workpiece holding device, which is supported on a distal end side of the second arm through intermediation of a third joint so as to be freely rotatable within the substantially horizontal plane, and is configured to releasably hold the workpiece; a first arm drive mechanism, which is configured to drive the first arm to rotate about the first joint; a second arm drive mechanism, which is configured to drive the second arm to rotate about the second joint with respect to the first arm; a workpiece holding device rotation drive mechanism, which is configured to drive the workpiece holding device to rotate about the third joint with respect to the second arm; and a tilt drive mechanism, which is configured to drive the workpiece holding device to rotate about a long axis of the workpiece holding device through intermediation of a fourth joint with respect to the distal end of the second arm.

According to one embodiment of the present invention, an electric motor being a drive source of the workpiece holding device rotation drive mechanism can be mounted to the vicinity of the second joint, and a transmission system of a driving force from the electric motor to the workpiece holding device can be accommodated on an inner side of the second arm.

According to one embodiment of the present invention, an electric motor being a drive source of the tilt drive mechanism can be mounted to the vicinity of the second joint, and a transmission system of a driving force from the electric motor to the workpiece holding device can be accommodated on an inner side of the second arm.

According to one embodiment of the present invention, the workpiece is placed to a downstream step by the tilt drive mechanism under a state in which a workpiece holding surface of the workpiece holding device is inclined with respect to the substantially horizontal plane.

BRIEF DESCRIPTION OF THE DRAWINGS

FIG. 6A is a front view for illustrating the second arms and the workpiece holding devices of the workpiece conveying apparatus according to the embodiment (swiveling angle: 90°, and tilting angle: 15°) (as viewed in the workpiece conveyance direction).

FIG. 6B is a top view (plan view) of FIG. 6A.

FIG. 6C is a right side view of FIG. 6A.

FIG. 6D is a perspective view of FIG. 6A.

FIG. 7 is a perspective view for illustrating an overall configuration of the workpiece conveying apparatus for a pressing machine according to the embodiment (swiveling angle: 0°, and tilting angle: 15°).

FIG. 9A is an explanatory view for illustrating an effect obtained by tilting the workpiece holding device of the workpiece conveying apparatus according to the embodiment (the workpiece can be set in the die while maintaining an inclined portion of the workpiece in a horizontal posture) (example of die that is integrally provided).

FIG. 9B is an illustration of an example case in which the die of FIG. 4A is integrally provided on right and left sides.

DESCRIPTION OF THE EMBODIMENTS

Now, with reference to the accompanying drawings, description is made of an example of a workpiece conveying apparatus for a pressing machine according to an embodiment of the present invention. The present invention is not limited to the embodiment described below.

The present invention has been made in view of the above-mentioned actual circumstances, and has an object to provide a workpiece conveying apparatus, which is capable of preventing increase in production cost, avoiding poor external appearance, and suppressing an adverse influence on a subsequent step even when a workpiece has an inclined portion, and is also capable of contributing to high speed conveyance.

Now, a configuration example of a workpiece conveying apparatus for a pressing machine according to this embodiment is described.

Figure 1:
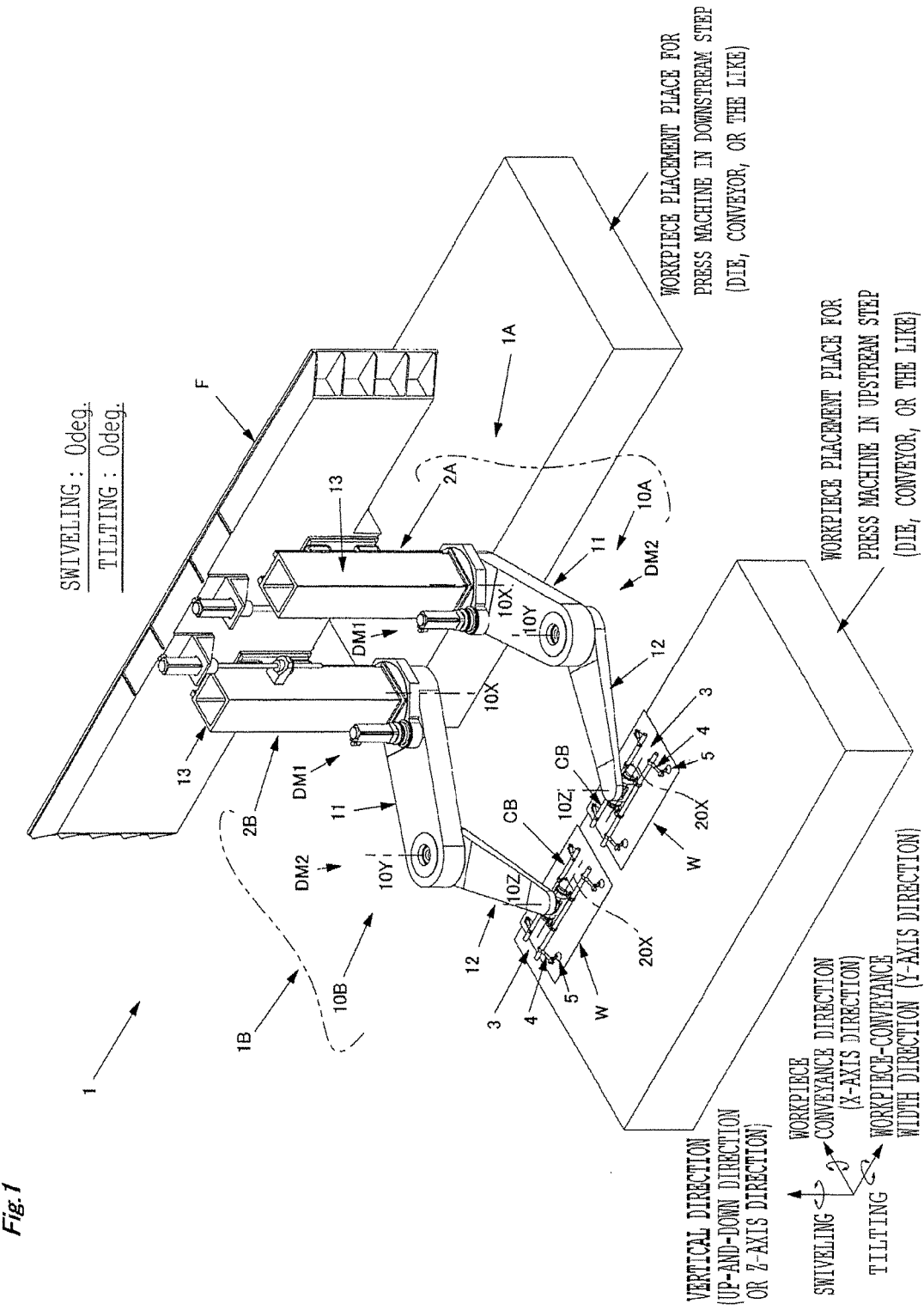
FIG. 1 is a perspective view for illustrating an overall configuration of a workpiece conveying apparatus for a pressing machine according to one embodiment of the present invention (swiveling angle: 0°, and tilting angle: 0°).

FIG. 1 is a perspective view of the workpiece conveying apparatus according to this embodiment. FIG. 2A to FIG. 2D are a front view, a top view (plan view), a right side view, and a perspective view for illustrating second arms and workpiece holding devices of the workpiece conveying apparatus according to this embodiment.

As illustrated in FIG. 1, a workpiece conveying apparatus 1 for a pressing machine according to this embodiment may includes:

two SCARA robots (robots) 1A and 1B, which respectively include arm units 10A and 10B each including two arms (a first arm 11 (upper arm) and a second arm 12 (front arm); those arms are also referred to as conveying arms), the two SCARA robots (robots) 1A and 1B being supported on a stationary frame F so as to be movable in an up-and-down direction (a vertical direction or a Z-axis direction), the stationary frame F being stationarily installed to a press line (press machine) or the like along a width direction (a workpiece-conveyance width direction or a Y-axis direction) of a workpiece conveyance direction (X-axis direction);

raising and lowering mechanisms 2A and 2B, which are configured to raise and lower the two SCARA robots 1A and 1B with respect to the stationary frame F, respectively and independently of each other, that is, mutually independently; and workpiece holding devices 3, which are supported on distal ends of the second arms 12 of the two arm units 10A and 10B, respectively.

However, the workpiece conveying apparatus according to the present invention may include only one SCARA robot. Further, a configuration without the raising and lowering mechanisms (2A and 2B) may also be adopted.

The workpiece holding devices 3 may each be capable of holding and releasing the workpiece W by a drawing device 5 (workpiece holding device utilizing magnetic attraction or vacuum (or negative pressure) suction by a suction cup or the like) supported on the leg portions 4 mounted to a cross bar CB.

The raising and lowering mechanism 2A (2B), which is configured to raise and lower the SCARA robot 1A (1B), that is, to move the SCARA robot 1A (1B) in the Z-axis direction, includes an electrical motor (such as servomotor), a ball screw, a ball screw nut (screw), a linear guide rail and the like. The SCARA robot LA (1B) is connected to the ball screw nut through intermediation of a raising and lowering frame 13 that is raised and lowered (or moved up and down) along the ball screw arranged substantially upright, that is, arranged to extend in the Z-axis direction.

The ball screw is rotated in a predetermined manner (or in an opposite direction) by a driving force of the electric motor (servomotor or the like) so that the SCARA robot 1A (1B) can be raised in an upward direction or lowered in a downward direction (Z-axis direction).

Here, the two robots 1A and 1B include the corresponding arm units 10A and 10B, respectively. The arm unit 10A (10B) includes:

the first arm 11 (upper arm), which is supported on the raising and lowering frame 13 through intermediation of a first joint 10X (a substantially vertical axis, a Z-axis, or a shoulder portion) so as to be freely rotatable within a substantially horizontal plane (XY plane); and the second arm 12 (front arm), which is supported on a distal end of the first arm 11 through intermediation of a second joint 10Y (the substantially vertical axis, the Z-axis, or an elbow joint) so as to be freely rotatable (the term "rotatable" hereinafter also encompasses turnable and pivotable) within the substantially horizontal plane (XY plane);

the workpiece holding device 3 (cross bar CB), which is coupled to the distal end of the second arm 12 of the arm unit 10A (10B) through intermediation of a third joint 10Z so as to be freely rotatable within the substantially horizontal plane (XY plane);

a first arm drive mechanism DM1 (electric motor (such as servomotor), and a speed reducer as needed), which is configured to drive the first arm 11 to rotate (swivel) about the first joint 10X with respect to the raising and lowering frame 13;

a second arm drive mechanism DM2 (electric motor (such as servomotor), and a speed reducer as needed), which is configured to drive the second arm 12 to rotate (swivel) about the second joint 10Y with respect to the first arm 11; and a workpiece holding device swivel (rotation) drive mechanism DM3, which is configured to drive the workpiece holding device 3 to rotate (swivel) about the third joint 10Z with respect to the distal end of the second arm 12.

Through drive and control of the arm units 10A and 10B of the two robots 1A and 1B having such configuration independently of each other, for example, each first arm 11 and each second arm 12 are rotated about each joint by each first arm drive mechanism DM1 and each second arm drive mechanism DM2. In this manner, the two workpieces W can be moved (or conveyed) independently of each other in the workpiece conveyance direction (X-axis direction).

The workpiece holding device 3 is caused to rotate (swivel) about the third joint 10Z with respect to the second arm 12 by the workpiece holding device swivel drive mechanism DM3. In this manner, postures of the two workpieces W within a horizontal plane during conveyance can be controlled independently of each other.

Further, in this embodiment, a tilt drive mechanism TM is provided between the distal end of the second arm 12 and the workpiece holding device 3 (drawing device 5).

The tilt drive mechanism TM is configured to be capable of relatively rotating the workpiece holding device 3 (drawing device 5) as well as, the workpiece W supported thereby about a fourth joint 20X with respect to the second arm 12 by the electric motor (servomotor) and the speed reducer provided as needed.

In the workpiece conveying apparatus 1 (robots 1A and 1B) for a pressing machine according to this embodiment, under the state illustrated in FIG. 1 and FIG. 2A to FIG. 2D (for example, an initial state), the robots 1A and 1B are raised and lowered respectively and independently of each other with respect to the stationary frame F by the raising and lowering mechanisms 2A and 2B. In this manner, the workpieces W on a die (bed), the workpieces W in a workpiece placement place, or the workpieces W on the conveyor belt (workpieces W arranged in parallel to each other in the workpiece conveyance direction) on an upstream step side can be drawn and supported by the drawing devices 5.

<Swiveling Operation>

Figure 2:
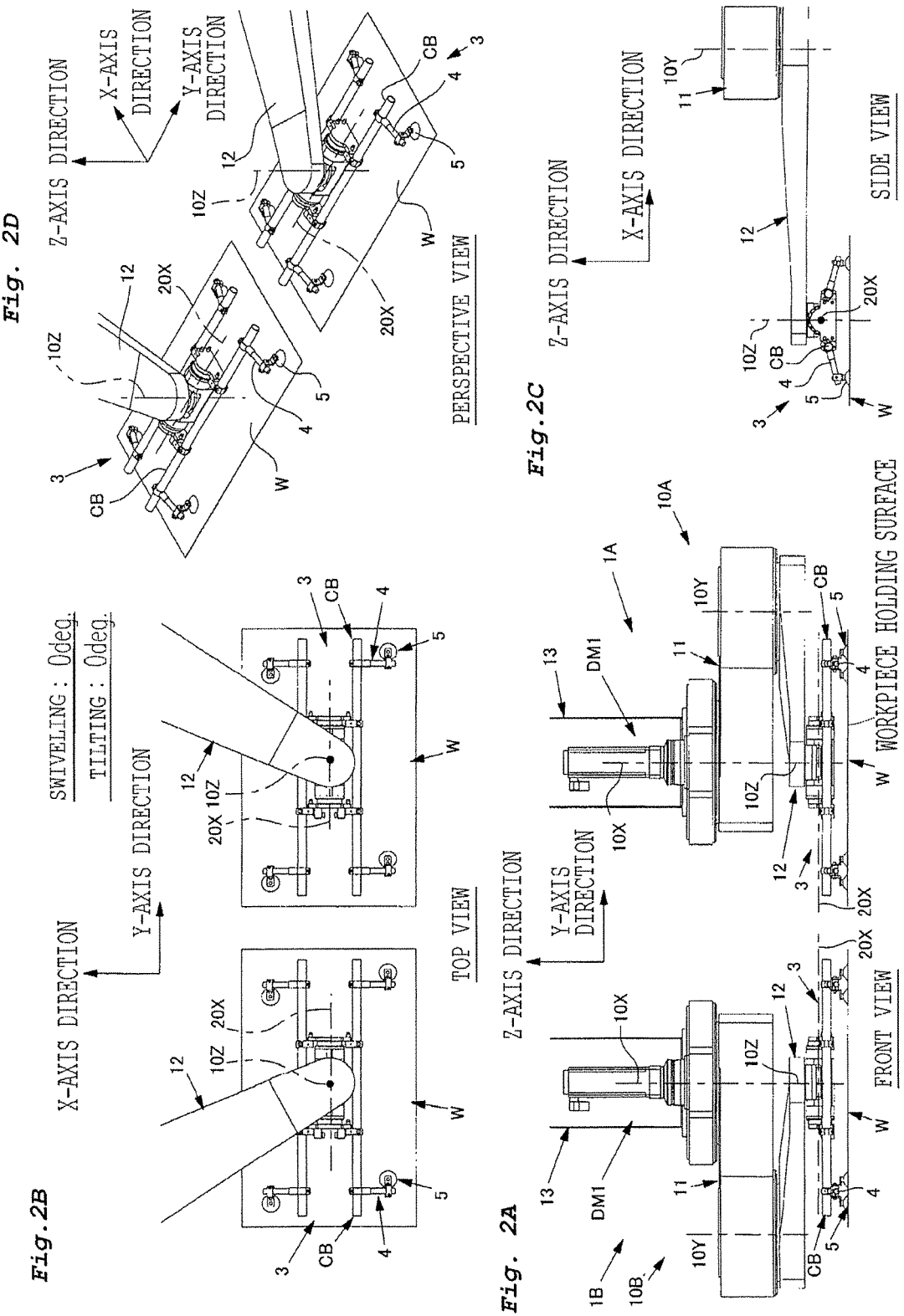
FIG. 2A is a front view for illustrating second arms and workpiece holding devices of the workpiece conveying apparatus according to the embodiment (swiveling angle: 0°, and tilting angle: 0°) (as viewed in a workpiece conveyance direction).
FIG. 2B is a top view (plan view) of FIG. 2A.
FIG. 2C is a right side view of FIG. 2A.
FIG. 2D is a perspective view of FIG. 2A.
Figure 3:
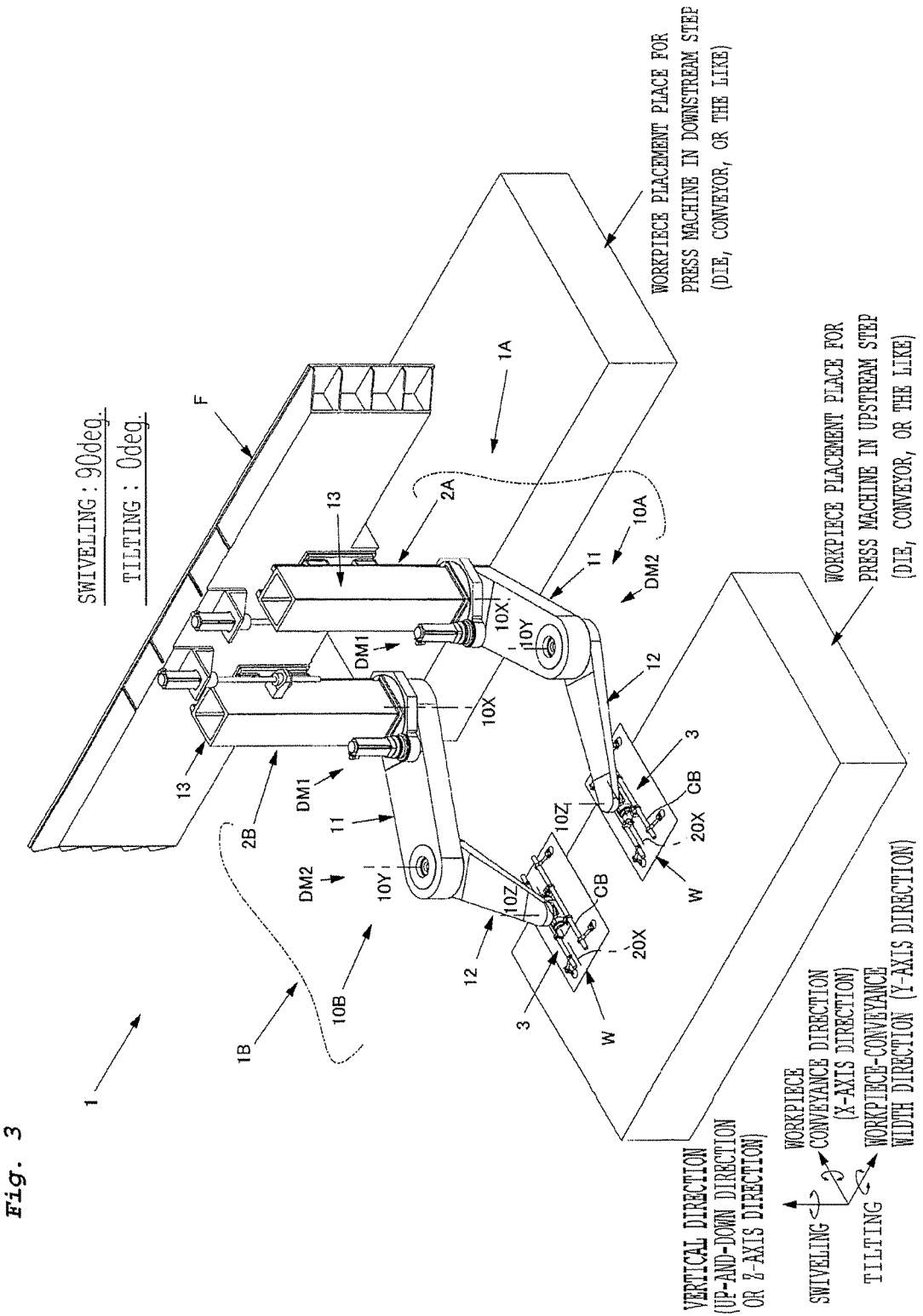
FIG. 3 is a perspective view for illustrating an overall configuration of the workpiece conveying apparatus for a pressing machine according to the embodiment (swiveling angle: 90°, and tilting angle: 0°).
Figure 4B:
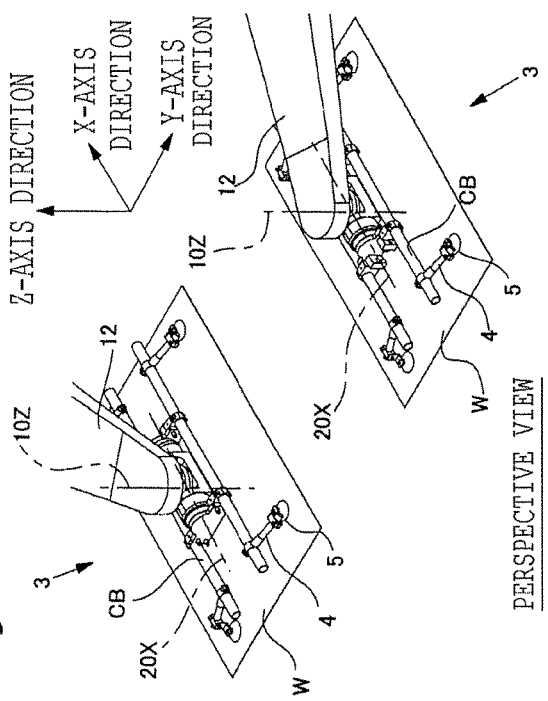
FIG. 4B is a top view (plan view) of FIG. 4A.
Figure 4D:
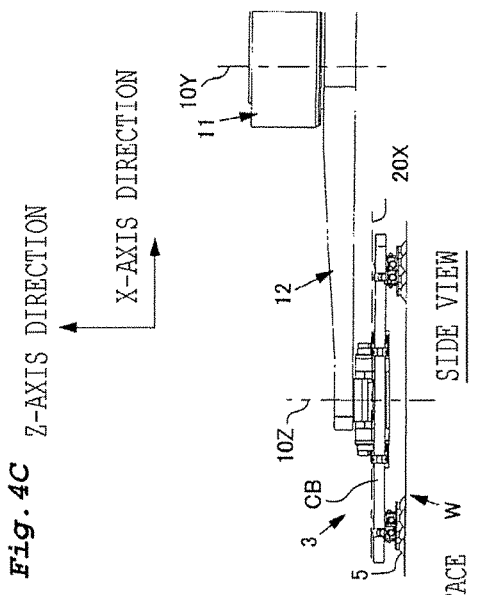
FIG. 4D is a perspective view of FIG. 4A.
Figure 4A:
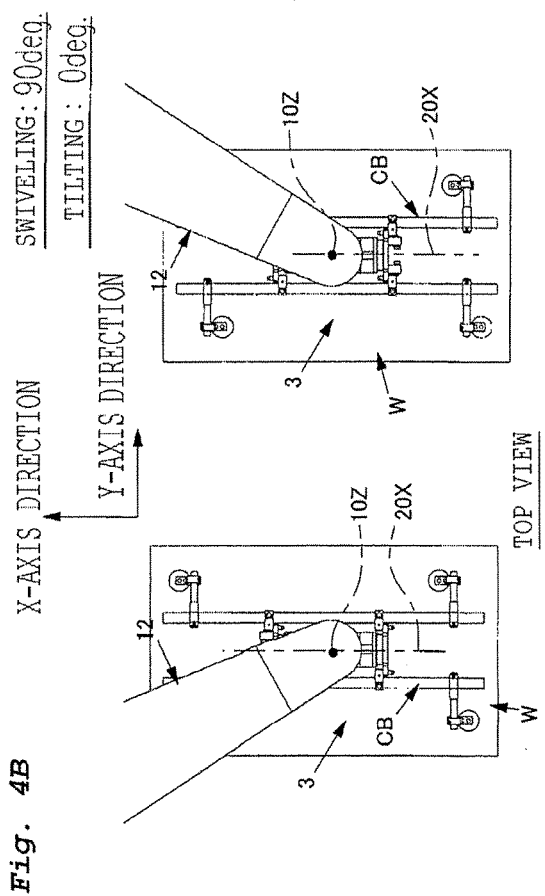
FIG. 4A is a front view for illustrating the second arms and the workpiece holding devices of the workpiece conveying apparatus according to the embodiment (swiveling angle: 90°, and tilting angle: 0°) (as viewed in the workpiece conveyance direction).
Figure 4C:
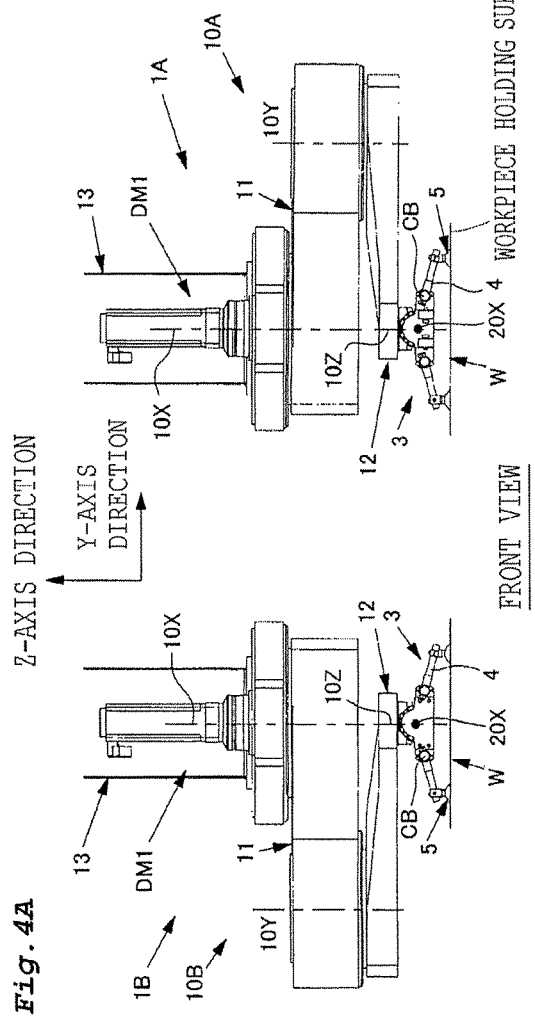
FIG. 4C is a right side view of FIG. 4A.

As illustrated in FIG. 3 and FIG. 4, in the workpiece conveying apparatus 1 (SCARA robots 1A and 1B), the workpiece holding devices 3 are rotated (swiveled) from the state of FIG. 1 and FIG. 2A to FIG. 2D about the third joints 10Z by 90° with respect to the distal ends of the second arms 12 by the workpiece holding device swivel drive mechanisms DM3. In this manner, the two workpieces W can be controlled independently of each other so as to have such a posture that the longitudinal direction (long-axis direction) thereof becomes substantially parallel to the workpiece conveyance direction. Note that, the swiveling angle can be suitably controlled.

<Tilting Operation>

Figure 5:
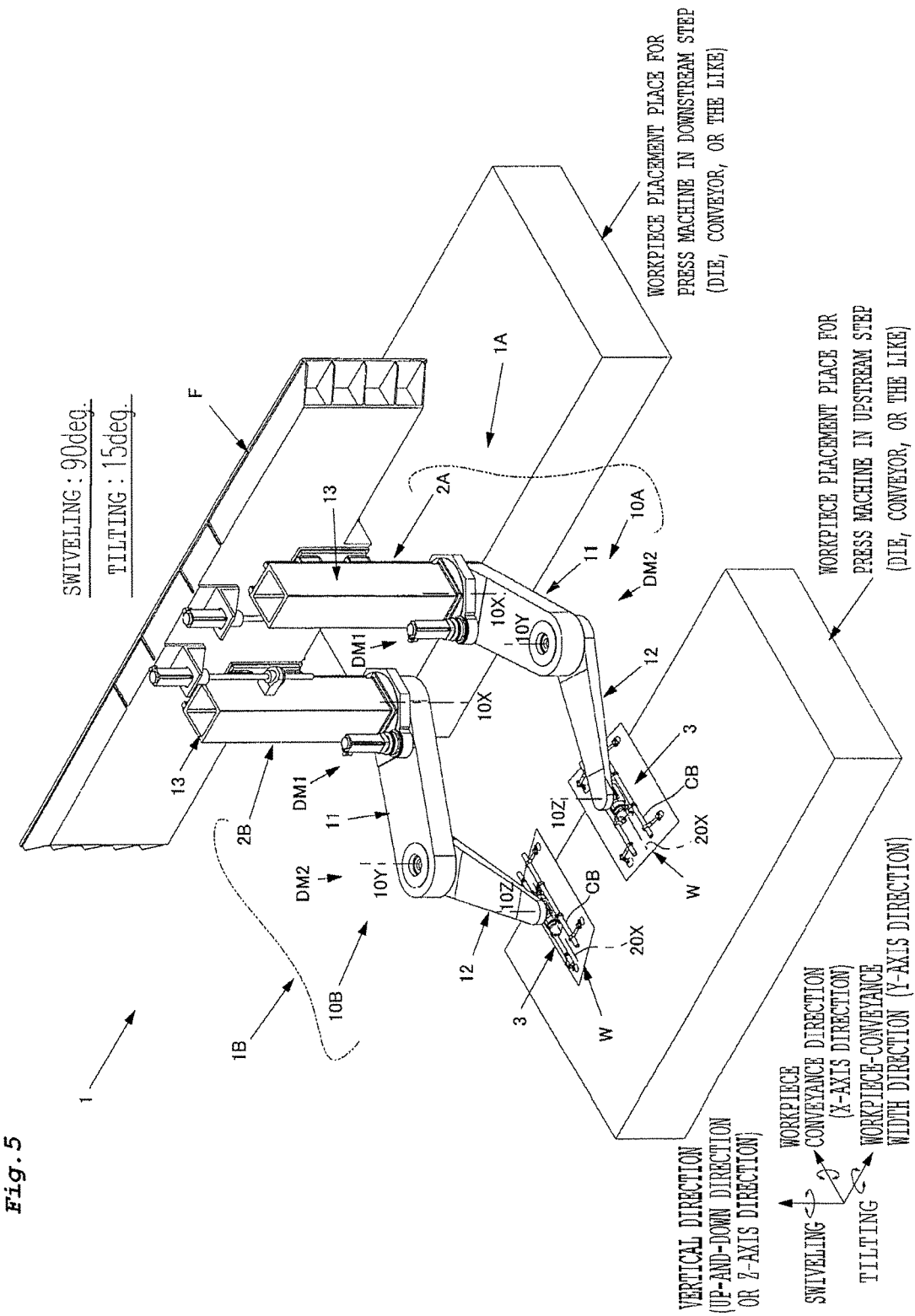
FIG. 5 is a perspective view for illustrating an overall configuration of the workpiece conveying apparatus for a pressing machine according to the embodiment (swiveling angle: 90°, and tilting angle: 15°).
Figure 8D:
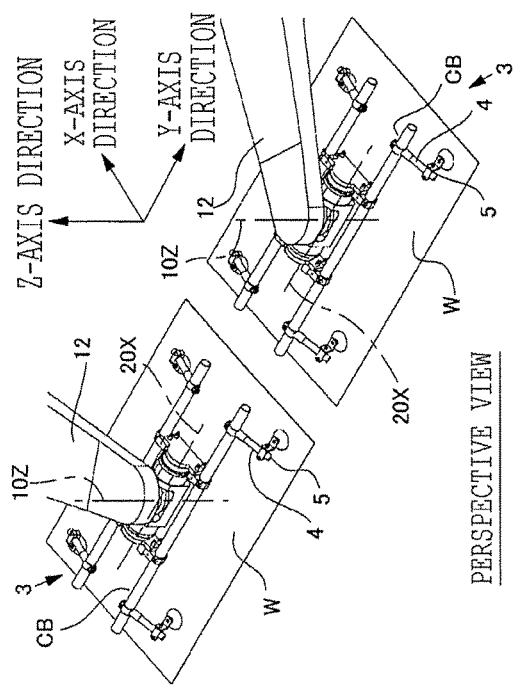
FIG. 8D is a perspective view of FIG. 8A.
Figure 8B:
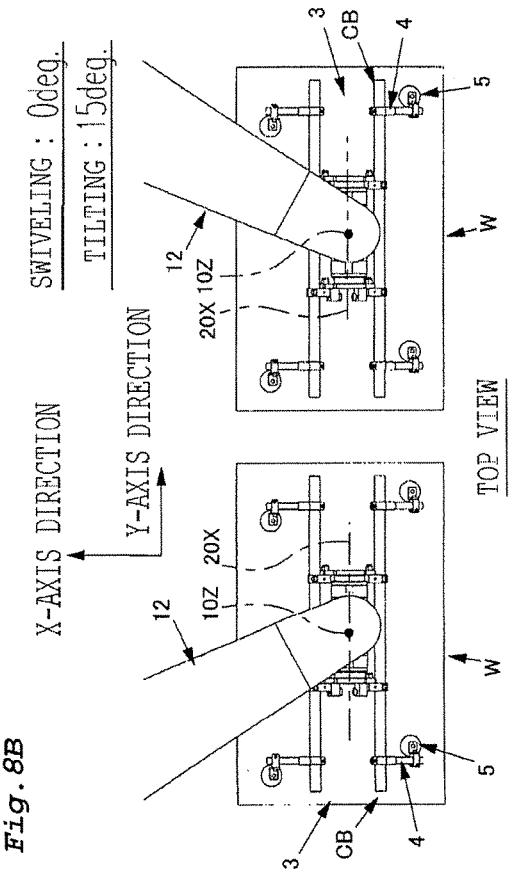
FIG. 8B is a top view (plan view) of FIG. 8A.
Figure 8C:
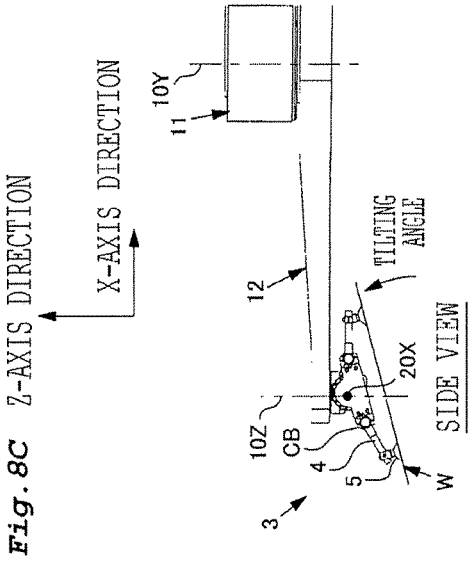
FIG. 8C is a right side view of FIG. 8A.
Figure 8A:
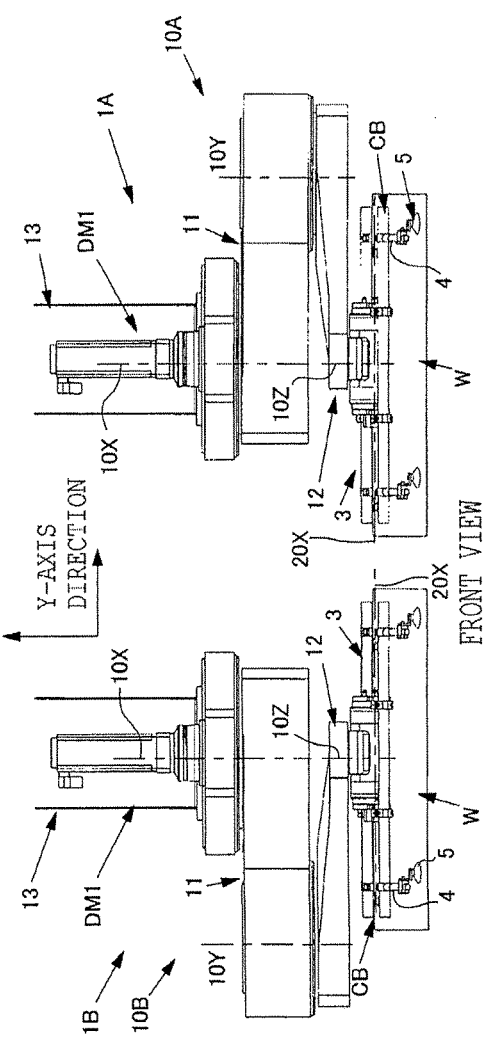
FIG. 8A is a front view for illustrating the second arms and the workpiece holding devices of the workpiece conveying apparatus according to the embodiment (swiveling angle: 0°, and tilting angle: 15°) (as viewed in the workpiece conveyance direction).

As illustrated in FIG. 5 and FIG. 6, in the workpiece conveying apparatus 1 (SCARA robots 1A and 1B), the workpiece holding devices 3 (drawing devices 5) as well as, the workpieces W supported thereby are relatively rotated independently of each other with respect to the second arms 12 about the fourth joints 20X by a predetermined tilting angle (15° in FIG. 5 and FIG. 6) from the state of FIG. 3 and FIG. 4 by the tilt drive mechanisms TM. In this manner, the workpieces W can be caused to have a supporting posture of an inverted V-shape as viewed in the workpiece conveyance direction (see FIG. 6A). Note that, the tilting angle can be suitably controlled.

Note that, as illustrated in FIG. 7 and FIG. 8, in the workpiece conveying apparatus 1 (SCARA robots 1A and 1B), the workpiece holding devices 3 (drawing devices 5) as well as, the workpieces W supported thereby are relatively rotated independently of each other with respect to the second arms 12 about the fourth joints 20X by a predetermined tilting angle (15° in FIG. 7 and FIG. 8) from the state of FIG. 1 and FIG. 2 by the tilt drive mechanisms TM. In this manner, the workpieces W can be caused to have a supporting posture in which the surface of the workpiece intersects with the horizontal plane as viewed in the workpiece conveyance direction (see FIG. 8C).

As described above, in the workpiece conveying apparatus 1 for a pressing machine according to one embodiment of the present invention, in the SCARA robots 1A and 1B including the plurality of conveying arms (first and second arms 11 and 12) (two conveying arms are provided in this embodiment, but a configuration in which two or more conveying arms are coupled may be employed) that are configured to be controlled (driven) to swivel (swing or pivot) independently of each other within the substantially horizontal plane, the distal end arms (second arms 12) include the workpiece holding devices 3 configured to hold the workpiece.

At the distal end arms (second arms 12), there are provided the workpiece holding device swivel drive mechanisms DM3 configured to swivel (turn, swing, or pivot) the workpiece holding device 3 within the substantially horizontal plane, and the tilt drive mechanisms TM configured to swivel (turn, swing, or pivot) the workpiece holding device 3 about the horizontal axis so as to be tilted. Through cooperation of the workpiece holding device swivel drive mechanisms DM3 and the tilt drive mechanisms TM, the plurality of workpieces W being conveyed in parallel can be held and controlled so as to have a posture of an inverted V-shape in the sectional shape (sectional shape taken along a substantially vertical plane that is substantially orthogonal to the workpiece conveyance direction) as viewed in the workpiece conveyance direction (see FIG. 6A).

Further, when a die having a workpiece placement surface that is inclined is prepared, as described above, the postures of the plurality of workpieces can be controlled in accordance with the workpiece placement surface that is inclined. Thus, the workpieces can be stably set to the die (can be set while preventing misalignment of the workpieces), and in addition, the workpieces can be set to the die while maintaining the inclined portion of the workpiece in a horizontal posture (see FIG. 9A, FIG. 9B, or other drawings).

As a result, punching by a punch for piercing formation along a thickness direction of the inclined portion of the workpiece can be performed on the respective inclined portions of the plurality of workpieces conveyed in parallel to each other along a raising and lowering direction of a slide. Piercing holes having a desired shape can be formed in the respective inclined portions of the plurality of workpieces so as to be substantially orthogonal to flat surfaces of the inclined portions without employing the complicated structure in which a cam is incorporated into the die unlike the related-art.

That is, desired piercing formation can be performed while preventing increase in production cost.

Further, in the workpiece conveying apparatus according to this embodiment, the workpiece can be tilted (inclined). Thus, even in a case in which the workpiece has an inclined portion, when the workpiece is to be released and placed on a horizontal place, such a state that the distal end side of the inclined portion is brought into contact with the horizontal place first, and then a portion held by the workpiece holding device falls out can be prevented. Accordingly, without causing a fear in that the workpiece is undesirably moved due to the falling to increase vibration noise, the workpiece can be accurately placed at a certain position, and, in addition, the workpiece conveying apparatus according to this embodiment is capable of contributing to achievement of high speed conveyance of the workpiece.

That is, according to this embodiment, it is possible to provide the workpiece conveying apparatus, which is capable of avoiding poor external appearance and suppressing an adverse influence on a subsequent step while preventing increase in production cost even when the workpiece has the inclined portion, and is also capable of contributing to high speed conveyance.

Even in a situation of conveyance of the workpiece on one side due to a production mode or at the time of emergency, through operation control of only any one of the conveying arms, the same effect can be expected.

Next, description is made of an embodiment of workpiece conveyance utilizing the workpiece conveying apparatus 1 (SCARA robots 1A and 1B) for a pressing machine according to this embodiment, which is capable of performing the operations described above.

<One Embodiment in Press Machine Entering Portion in Tandem Press Line "Front of Line (FOL)">

For the cross bars CB mounted to the distal end portions of the second arms 12 of the plurality of horizontal articulated conveying arms (SCARA robots 1A and 1B) that are controlled to be driven (operated) independently of each other, there are provided the workpiece holding device swivel drive mechanisms DM3 and the tilt drive mechanisms TM. Thus, in the front of the tandem press line (FOL), operations as described in Step S1 to Step S5 below are performed.

<Step 1 (S1)>

Figures 11A, 11B:
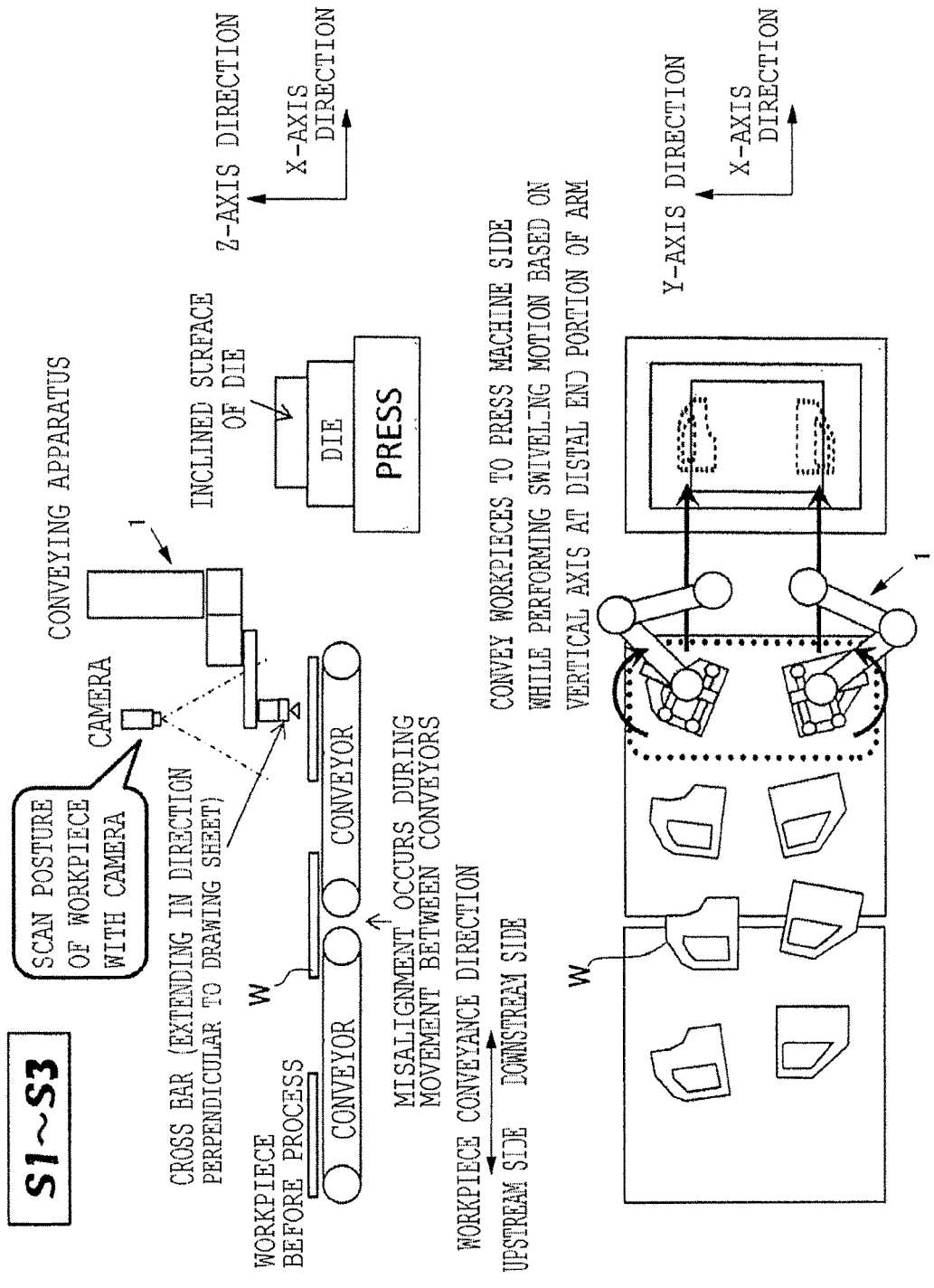
FIG. 11A is an explanatory side view for illustrating a conveyance operation in FOL (S1 to S3) by the workpiece conveying apparatus according to the embodiment (as viewed in the workpiece-conveyance width direction).
FIG. 11B is a top view of FIG. 11A.

There is a case in which conveyance workpieces on the conveyors is misaligned when moving between the conveyors. For example, when a clearance is present between the conveyor belts continuously provided in the conveyance direction as illustrated in FIG. 11A, there is a fear in that the workpieces W may be misaligned due to the clearance as illustrated in FIG. 11B.

<Step 2 (S2)>

Postures of the workpieces are scanned (recognized) by a camera or the like arranged above the end portion of the conveyor (see FIG. 11A), and the posture information is transmitted to a control device of the workpiece conveying apparatus. The function corresponds to an example of workpiece posture information acquisition means.

<Step 3 (S3)>

In the control device of the workpiece conveying apparatus, based on the posture information, the cross bars CB supported on the distal ends of the conveying arms (second arms 12) are swiveled about the third joints 10Z in a predetermined manner (to an angle at which the workpieces W can easily be drawn and held) by the workpiece holding device swivel drive mechanisms DM3 in accordance with the postures of the misaligned workpieces W. In this manner, the workpieces W are drawn and held by the drawing devices 5 (see FIG. 11B).

It is also possible to employ the following configuration. Specifically, postures of the workpieces W (degree of inclination of drawing and holding surfaces (workpiece holding planes)) are acquired by a camera or the like. Correspondingly to the postures, the cross bars CB are swiveled (tilted) about the fourth joints 20X by the tilt drive mechanisms TM, and then, the workpieces W are drawn and held by the drawing devices 5.

<Step 4 (S4)>

Figure 12A:
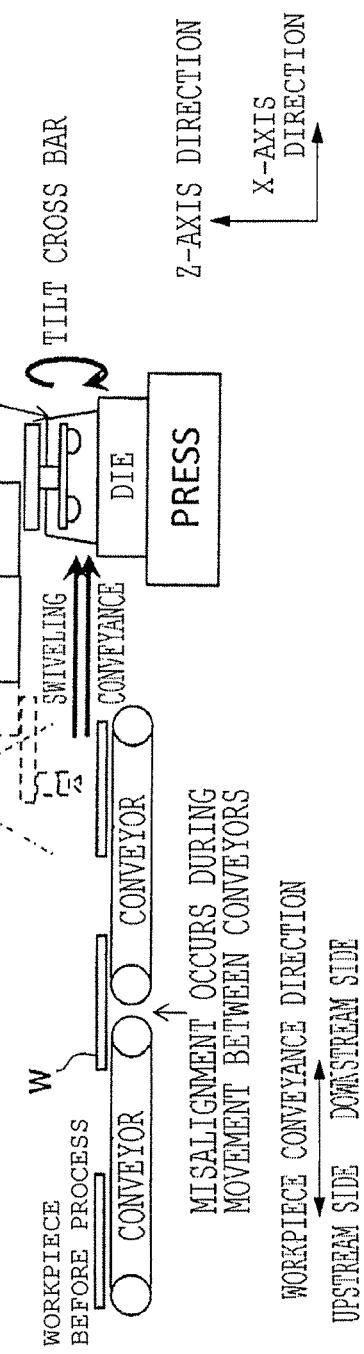
FIG. 12A is an explanatory side view for illustrating a conveyance operation in FOL (S4 to S5) by the workpiece conveying apparatus according to the embodiment (as viewed in the workpiece-conveyance width direction).
Figure 12B:
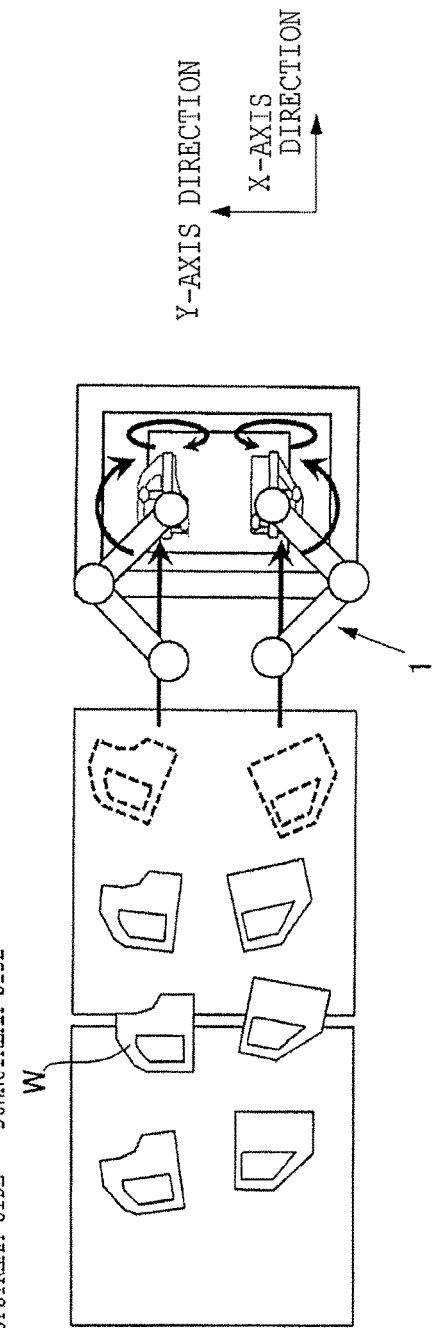
FIG. 12B is a top view of FIG. 12A.

While the cross bars CB are swiveled and driven to tilt, the plurality of workpieces W are conveyed into (carried into) the press machine so as to have a symmetrical inclination relationship (inverted V-shape) (see FIG. 6A or other drawings) (see FIG. 12A and FIG. 12B).

<Step 5 (S5)>

The plurality of workpieces W held so as to have a posture of an inverted V-shape are set on the inclined portions of the die (see FIG. 9A, FIG. 9B, or other drawings).

As described above, in the workpiece conveying apparatus 1 according to the present invention, on the distal end portions of the second arms 12 configured to be operated (moved) in the workpiece conveyance direction through swiveling (turning or swinging) within the substantially horizontal plane, there are provided the workpiece holding device swivel drive mechanisms DM3 and the tilt drive mechanisms TM. Thus, the workpiece holding devices 3 (cross bars CB) as well as, the workpieces W can be swiveled and tilted (inclined) within the substantially horizontal plane. Accordingly, while the postures of the workpieces W being conveyed on the conveyor are corrected solely by the workpiece conveying apparatus, the plurality of workpieces W can be conveyed from the conveyor into (carried into) the press machine by being held so as to have a posture of an inverted V-shape in accordance with the inclination placement portions of the die in the press machine.

Figure 13:
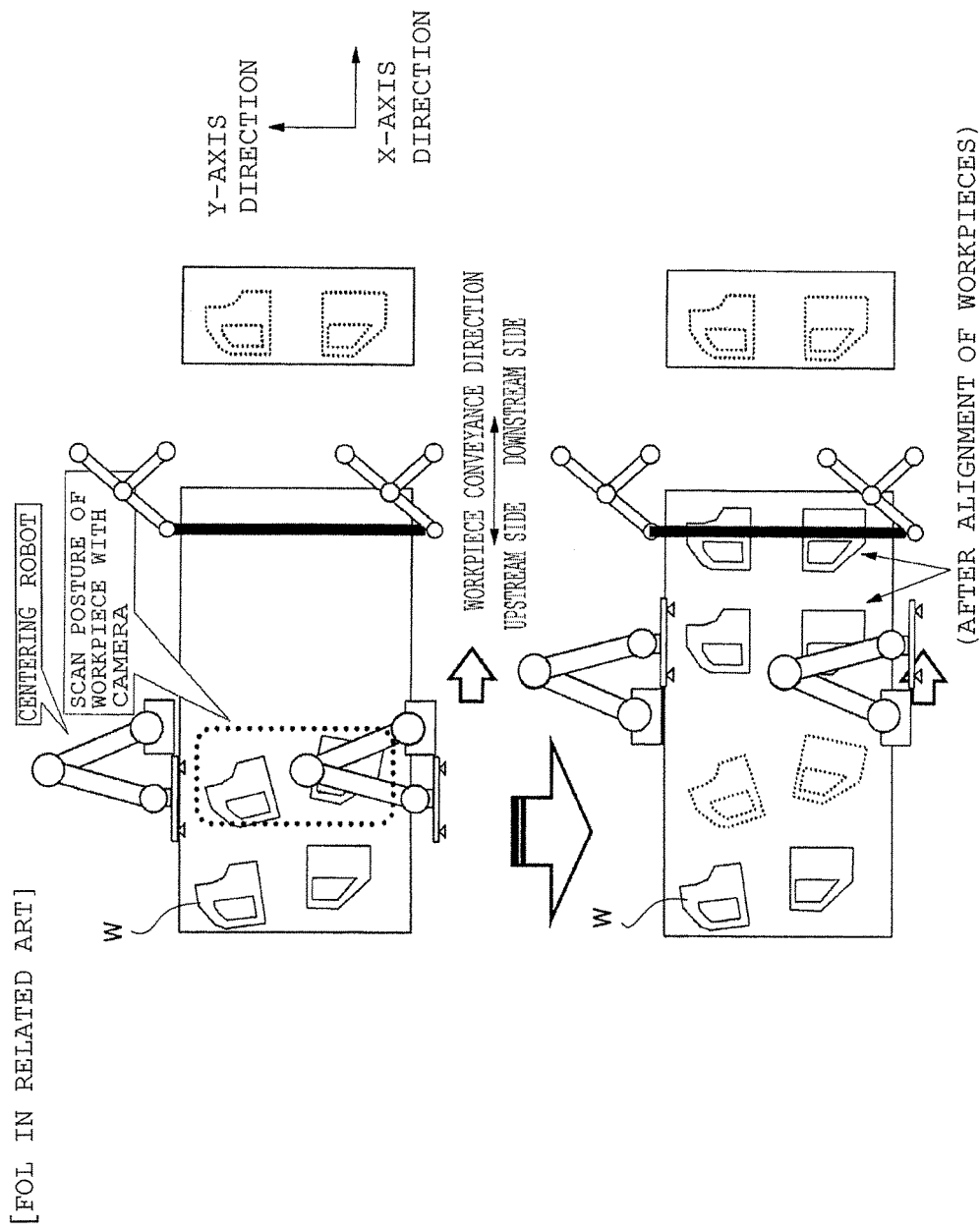
FIG. 13 is an explanatory view for illustrating a state of conveyance in FOL in a related-art workpiece conveying apparatus.

Therefore, in the workpiece conveying apparatus 1 according to the present invention, it is not required to install a centering robot (robot for workpiece posture correction: see FIG. 13), which has been often used in the related art on the workpiece carrying-in side in the tandem press line (FOL), separately from the workpiece conveying apparatus. Thus, a space-saving conveyance line can be achieved at lower cost.

<One Embodiment in Press Machine Exiting Portion in Tandem Press Line "End of Line (EOL)">

For the cross bars CB mounted to the distal end portions of the second arms 12 of the plurality of horizontal articulated conveying arms (SCARA robots 1A and 1B) that are controlled to be driven (operated) independently of each other, there are provided the workpiece holding device swivel drive mechanisms DM3 and the tilt drive mechanisms TM. Thus, also in the end of the tandem press line (EOL), operations as described in Step S11 to Step S15 below are performed.

<Step 11 (S11)>

Figure 14:
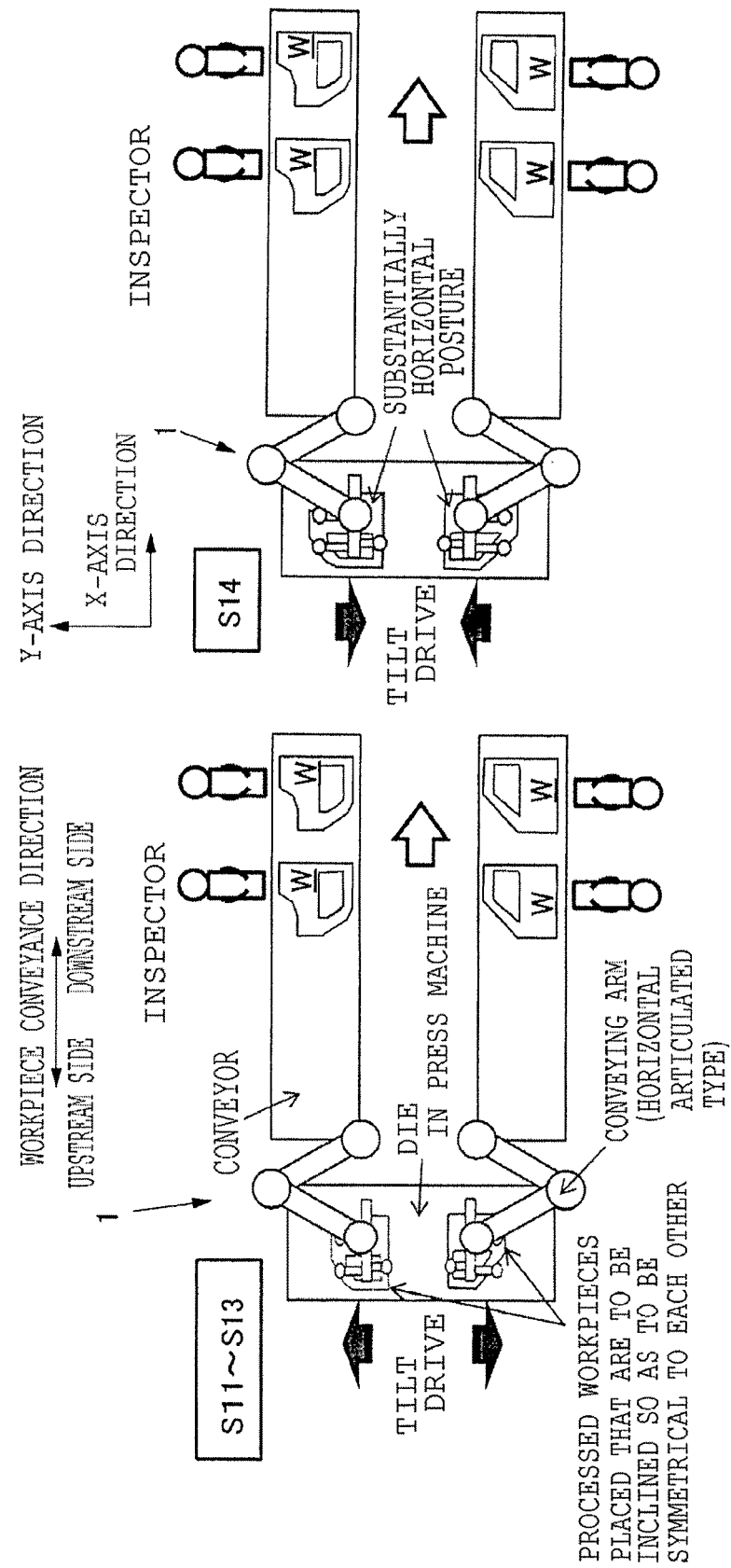
FIG. 14A is an explanatory top view for illustrating a conveyance operation in EOL (S11 to S13) by the workpiece conveying apparatus according to the embodiment.
FIG. 14B is an explanatory top view for illustrating a conveyance operation in S14.

The plurality of workpieces W (workpieces W in parallel along the workpiece-conveyance width direction), which have been subjected to press working simultaneously, are placed on the die in the press machine so as to have a posture of an inverted V-shape as viewed in the workpiece conveyance direction (see FIG. 14A).

<Step 12 (S12)>

The postures of the cross bars CB are controlled so that an extending direction of the cross bars CB matches with the workpiece conveyance direction. Further, through tilt drive of the cross bars CB, the workpiece holding devices 3 mounted to the cross bars CB are controlled so as to have a posture of an inverted V-shape as viewed in the workpiece conveyance direction (see FIG. 9A and FIG. 9B).

<Step 13 (S13)>

The processed workpieces (see FIG. 9A and FIG. 9B) placed so as to have a posture of an inverted V-shape are drawn and held by the workpiece holding devices 3 controlled so as to have the posture of an inverted V-shape (see FIG. 14A).

<Step 14 (S14)>

Regarding the plurality of processed workpieces held by the workpiece holding devices 3, through tilt drive of the cross bars CB (tilt drive in opposite direction to that of the tilt drive in S12), the workpiece holding devices 3 as well as the processed workpieces are controlled so as to have a substantially horizontal posture (see FIG. 14(B)).

<Step 15 (S15)>

Figure 15:
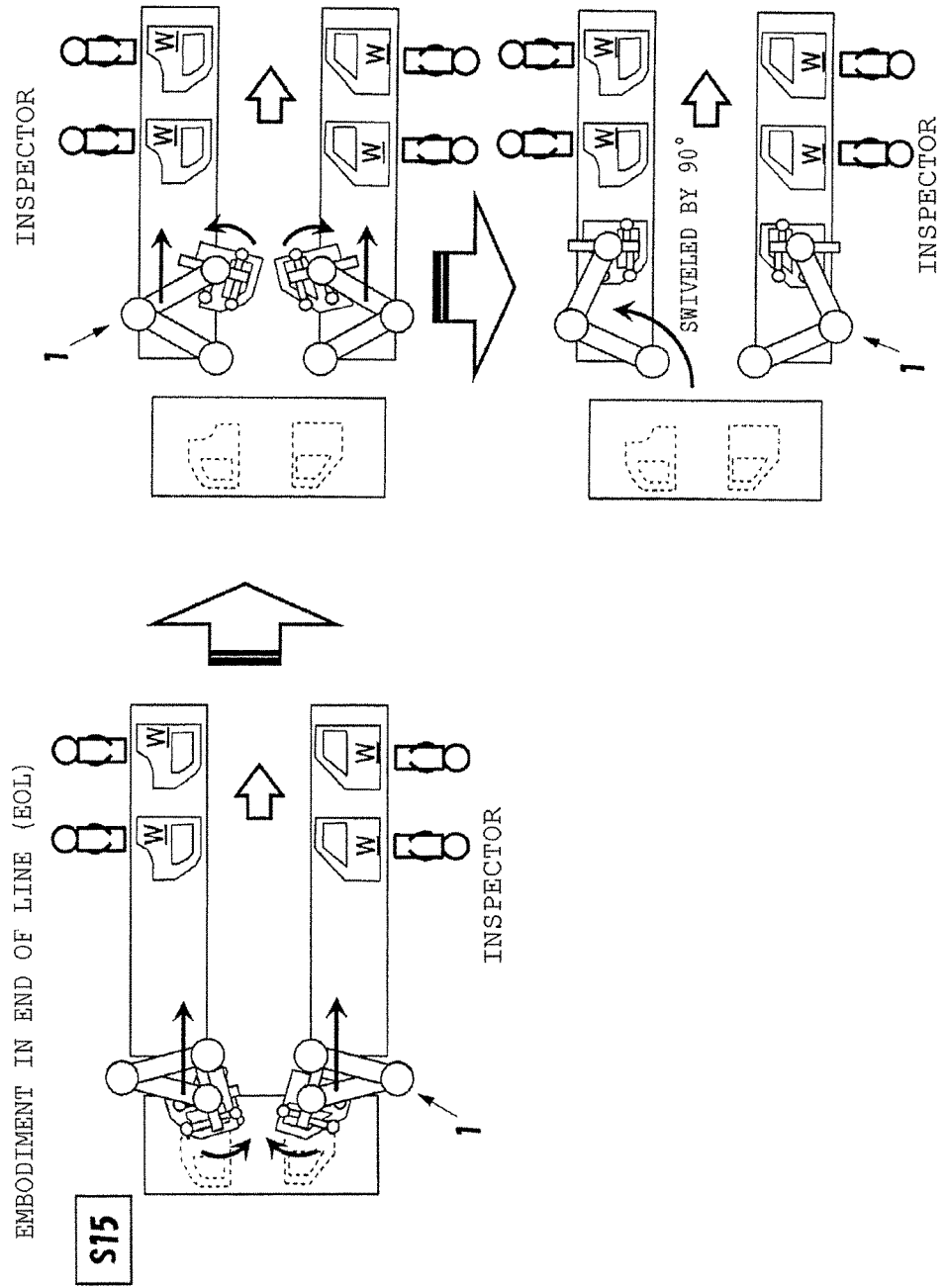
FIG. 15 is an explanatory top view for illustrating a conveyance operation in EOL (S15) by the workpiece conveying apparatus according to the embodiment.

The processed workpieces held so as to have a substantially horizontal posture are conveyed from the die (press machine) side to the conveyor side by the conveying arms (SCARA robots 1A and 1B), and are controlled so as to have a posture of being swiveled at 90° within the substantially horizontal plane (see FIG. 15).

The processed workpieces are placed on the conveyor under the state of being swiveled at 90° within the substantially horizontal plane as described above because of the following reason. At the time of product inspection of checking the processed workpieces on the conveyor on the lateral side of the conveyor by an operator or the like, an important part or the like of the processed workpieces can be easily checked from an outer side so that the product inspection can be performed efficiently and reliably.

As described above, in the workpiece conveying apparatus 1 according to the present invention, for the distal end portions of the second arms 12 configured to be operated (moved) in the workpiece conveyance direction through swiveling (turning or swinging) within the substantially horizontal plane, there are provided the workpiece holding device swivel drive mechanisms DM3 and the tilt drive mechanisms TM, the workpiece holding devices 3 (cross bars CB) as well as the workpieces W can be swiveled and tilted (inclined) within the substantially horizontal plane. Thus, the plurality of processed workpieces, which are inclined so as to be symmetrical to each other (for example, inclined so as to have a posture of an inverted V-shape as viewed in the workpiece conveyance direction) in the die in the press machine, can be directly held solely by the workpiece conveying apparatus. Further, the processed workpieces can be conveyed (carried out) to a downstream step such as the conveyor while being swiveled at the predetermined angle (for example, at 90°) under the substantially horizontal state as it is.

Figure 16:
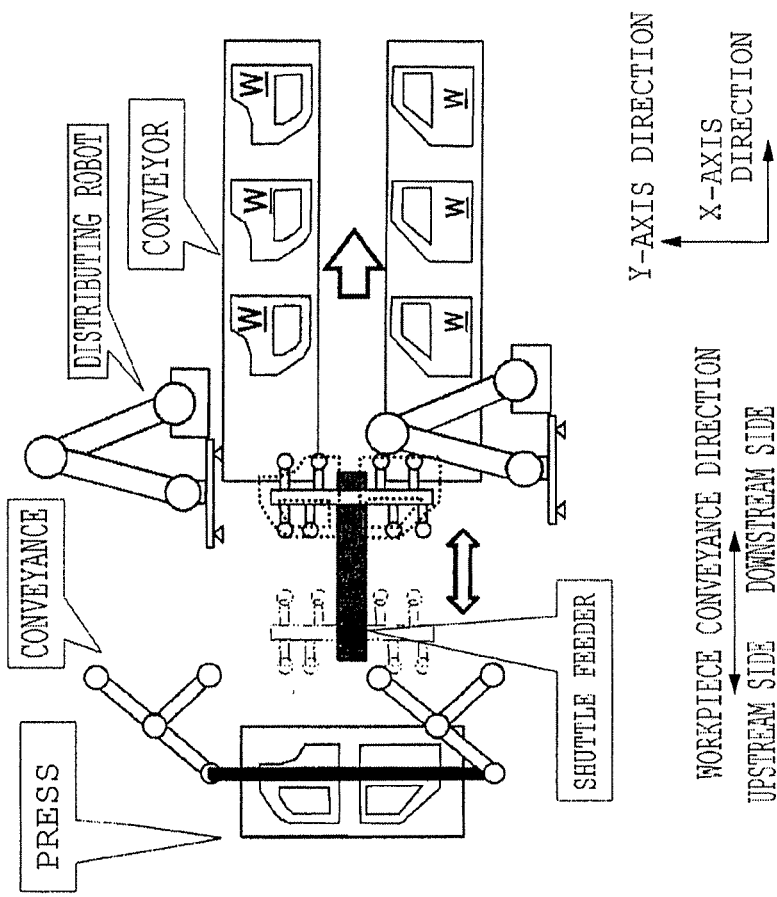
FIG. 16 is an explanatory view for illustrating a state of conveyance in EOL in the related-art workpiece conveying apparatus.

Therefore, in the workpiece conveying apparatus 1 according to the present invention, it is not required to install a shuttle feeder (workpiece transfer device for transferring the workpieces between the workpiece conveying apparatus on the upstream step side and the conveyor on the downstream step side) and a distributing robot (means that has a role of transferring and placing the workpieces transferred by the shuttle feeder onto the conveyor while adjusting the postures) as illustrated in FIG. 16, which have been often used in the related art on the workpiece carrying-out side in the tandem press line (EOL). Thus, a space-saving conveyance line having a small line length can be achieved at lower cost.

Here, one specific configuration example of the workpiece conveying apparatus 1 according to this embodiment is described in detail.

Figure 10:
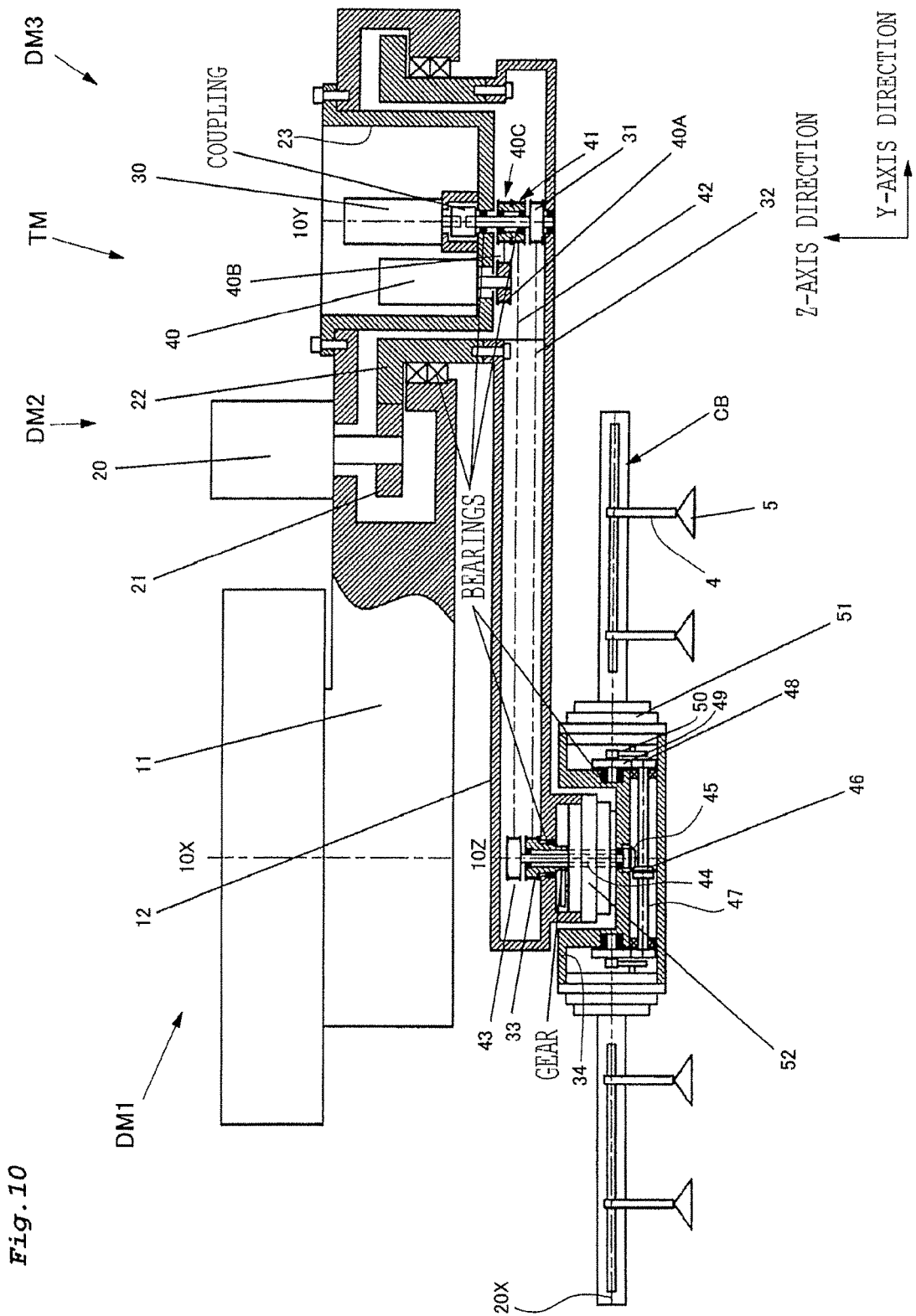
FIG. 10 is a sectional view for illustrating details of a configuration example of a second arm drive mechanism DM2 and a tilt drive mechanism TM of the workpiece conveying apparatus according to the embodiment.

As illustrated in FIG. 10, in the workpiece conveying apparatus 1 according to this embodiment, the second arm 12 (front arm) is supported on the distal end of the first arm 11, which is supported so as to be freely swivable (rotatable) about the first joint 10X with respect to the raising and lowering frame 13, through intermediation of the second joint 10Y (substantially vertical axis) so as to be swivable (rotatable) within the substantially horizontal plane, and the workpiece holding device 3 (cross bar CB) is coupled to the distal end of the second arm 12 through intermediation of the third joint 10Z so as to be freely swivable (rotatable) within the substantially horizontal plane.

There is provided the first arm drive mechanism DM1 (electric motor (such as servomotor), and the speed reducer as needed), which is configured to drive the first arm 11 so as to rotate (swivel) about the first joint 10X with respect to the raising and lowering frame 13.

As illustrated in FIG. 10, the second arm drive mechanism DM2 (electric motor (such as servomotor), and the speed reducer as needed), which is configured to drive the second arm 12 to rotate (swivel) about the second joint 10Y with respect to the first arm 11, includes a second arm rotation drive motor 20. The second arm rotation drive motor 20 is mounted to the first arm 11, and a gear (outer periphery gear) 21 is mounted to an output rotary shaft thereof.

A gear (outer periphery gear) 22 is meshed with the gear 21. The gear 22 is supported on the first arm 11 so as to be freely rotatable about the second joint 10Y, and is configured to be driven by the gear 21 so as to be rotated (swiveled) about the second joint 10Y.

Meanwhile, the second arm 12 is mounted to the gear 22. Thus, through rotation drive of the second arm rotation drive motor 20 of the second arm drive mechanism DM2, the second arm 12 is driven to rotate (swivel) about the second joint 10Y with respect to the first arm 11.

Further, the workpiece holding device swivel drive mechanism DM3, which is configured to drive the workpiece holding device 3 (cross bar CB) to rotate (swivel) about the third joint 10Z with respect to the distal end of the second arm 12, includes a swivel drive motor 30 (electric motor (such as servomotor)) arranged coaxially with the second joint 10Y, a swiveling drive pulley 31 mounted to the output rotary shaft, and a swiveling driven pulley 33 rotationally coupled to the swiveling drive pulley 31 through intermediation of a belt 32.

The swiveling drive pulley 31, the belt 32, and the swiveling driven pulley 33 are accommodated in an inner part (on an inner side) of the second arm 12.

That is, a transmission system (channel or the like) of a driving force of the workpiece holding device swivel drive mechanism (workpiece holding device rotation drive mechanism) DM3 is accommodated in the inner part (on the inner side) of the second arm 12. The present invention is not limited to the exemplified transmission system through the belt drive by the swiveling drive pulley 31, the belt 32, and the swiveling driven pulley 33. As the transmission system of the driving force of the workpiece holding device swivel drive mechanism (workpiece holding device rotation drive mechanism) DM3 according to the present invention, other transmission systems utilizing a bevel gear, a shaft, or the like may be employed.

Further, the swivel drive motor 30 is accommodated in a recessed portion 23 formed in the vicinity of the second joint 10Y of the first arm 11, and is mounted substantially integrally with the first arm 11 and coaxially with the second joint 10Y.

The swiveling drive pulley 31 is arranged coaxially with the second joint 10Y. Meanwhile, the swiveling driven pulley 33 is arranged coaxially with the third joint 10Z, and is mounted to a bracket 34 supported so as to be freely rotatable about the third joint 10Z with respect to the distal end of the second arm 12. The workpiece holding device 3 (cross bar CB) is mounted to the bracket 34.

Therefore, when the swivel drive motor 30 is driven to rotate, the swiveling drive pulley 31 is rotated, and, correspondingly thereto, the swiveling driven pulley 33 rotationally coupled to the swiveling drive pulley 31 through intermediation of the belt 32 is driven to rotate.

The swiveling driven pulley 33 is coupled to the bracket 34 through intermediation of the swiveling (rotating) speed reducer 52 or the like provided as needed, and the bracket 34 is supported so as to be freely rotatable about the third joint 10Z with respect to the distal end of the second arm 12. Thus, through the rotation of the swiveling driven pulley 33, the bracket 34 as well as the workpiece holding device 3 (cross bar CB) are relatively rotated about the third joint 10Z with respect to the distal end of the second arm 12.

Further, the workpiece conveying apparatus 1 according to this embodiment includes the tilt drive mechanism TM between the distal end of the second arm 12 and the workpiece holding device 3 (drawing device 5).

As illustrated in FIG. 10, the tilt drive mechanism TM is accommodated in the recessed portion 23 formed in the vicinity of the second joint 10Y of the first arm 11, and includes a tilt drive motor 40 (electric motor (such as servomotor)) mounted to the first arm 11 substantially integrally therewith.

An output rotary shaft of the tilt drive motor 40 is arranged substantially in parallel to the second joint 10Y, and a tilting drive pulley 40A is mounted thereto. A second tilting drive pulley 40C is rotationally coupled to the tilting drive pulley 40A through intermediation of a belt 40B. As illustrated in FIG. 10, the second tilting drive pulley 40C is supported on an outer periphery of the output rotary shaft of the swivel drive motor 30 coaxially with the output rotary shaft so as to be freely rotatable. That is, the second tilting drive pulley 40C is supported on the outer periphery of the output rotary shaft so as to be freely rotatable independently of a rotational force of the output rotary shaft of the swivel drive motor 30.

Further, a third tilting drive pulley 41 around which another belt 42 is stretched at a portion below the belt 40B is coupled to the second tilting drive pulley 40C, and the belt 42 is stretched around a tilting driven pulley 43 on the opposite side.

The tilting drive pulley 40A, the belt 40B, the second tilting drive pulley 40C, the third tilting drive pulley 41, the belt 42, and the tilting driven pulley 43 are accommodated in the inner part (on the inner side) of the second arm 12.

That is, the transmission system of the drive force (channel or the like) of the tilt drive mechanism TM is accommodated in the inner part (on the inner side) of the second arm 12. The present invention is not limited to the exemplified transmission system through the belt drive by the tilting drive pulley 40A, the belt 40B, the second tilting drive pulley 40C, the third tilting drive pulley 41, the belt 42, and the tilting driven pulley 43. As the transmission system of the driving force of the tilt drive mechanism TM according to the present invention, other transmission systems utilizing a bevel gear, a shaft, or the like may be employed.

The tilting driven pulley 43 is arranged coaxially with the third joint 10Z. Meanwhile, a shaft 44 connected to the tilting driven pulley 43 passes through an inner side of a hollow rotary shaft of the swiveling driven pulley 33 and extends to the inner side of the bracket 34. Therefore, the tilting driven pulley 43 and the shaft 44 are rotatable about the third joint 10Z independently of the swiveling driven pulley 33 and the bracket 34.

The distal end side of the shaft 44 (side opposite to the pulley 43) extends to the inner side of the bracket 34, and a bevel gear 45 is mounted to the distal end of the shaft 44. The bevel gear 45 is substantially orthogonal to the shaft 44, and is meshed with a bevel gear 46 fixed to a horizontal shaft 47 arranged substantially in parallel to the cross bar CB.

Further, the horizontal shaft 47 is supported on the bracket 34 substantially in parallel to the fourth joint 20X so as to be freely rotatable, and a gear 48 is mounted to the horizontal shaft 47.

The gear 48 is meshed with a gear 49, and the gear 49 is coupled to the cross bar CB through intermediation of a gear mechanism 50, a tilting speed reducer 51, and the like.

Therefore, when the tilt drive motor 40 is driven to rotate, the third tilting drive pulley 41 is rotated through intermediation of the tilting drive pulley 40A, the belt 40B, and the second tilting drive pulley 40C, and, correspondingly thereto, the tilting driven pulley 43 rotationally coupled to the third tilting drive pulley 41 through intermediation of the belt 42 is driven to rotate. The shaft 44 is coupled to the tilting driven pulley 43. Thus, the horizontal shaft 47 is driven to rotate through intermediation of the bevel gears 45 and 46.

Then, the rotation of the horizontal shaft 47 is transmitted to the cross bar CB through intermediation of the gears 48 and 49, the gear mechanism 50, and the tilting speed reducer 51, and the cross bar CB is rotated about the fourth joint 20X. In this manner, the workpiece holding device 3 as well as the workpiece W can be relatively rotated (tilted) about the fourth joint 20X with respect to the bracket 34 and the second arm 12.

As described above, the workpiece conveying apparatus 1 according to this embodiment includes the workpiece holding device swivel drive mechanism DM3 and the tilt drive mechanisms TM having the configurations as illustrated in FIG. 10. Thus, the workpiece holding device 3 (cross bar CB) as well as the workpieces W can be swiveled about the third joint 10Z with respect to the second arm 12 and can be tilted about the fourth joint 20X.

Further, in the workpiece conveying apparatus 1 according to this embodiment, the tilt drive motor 40 is arranged in the recessed portion 23 in the vicinity of the swivel drive motor 30, the pulleys (31, 33, 40A, 40C, 41, and 43), the belts (32, 40B, and 42) (further, the shaft 44), and the like are provided inside the second arm 12. Thus, routing of wirings for a motor or the like can be reduced (wirings for a motor having a large diameter and low flexibility can be reduced) outside the second arm 12.

Further, when the wirings for a motor or the like are routed to the outside of the second joint 10Y, through the bending and stretching operation about the second joint 10Y for the first arm 11 and the second arm 12, an inertia force acts on the routed wirings for a motor or the like. Thus, the wirings for a motor or the like are undesirably moved (swung), with the result that breakage or the like is liable to occur. However, such fear can be eliminated by the workpiece conveying apparatus 1 having the configuration as illustrated in FIG. 10 (configuration in which the wirings for a motor or the like are arranged inside the second arm 12).

Further, according to this embodiment, the pulleys (31, 33, 40A, 40C, 41, and 43), the belts (32, 40B, and 42) (further, the shaft 44), and the like are provided inside the second arm 12. Further, there is no limitation that may be imposed by the routing of the wirings for a motor or the like on the outside of the second arm 12. Thus, a swiveling motion range and a tilt movable range of the cross bar CB mounted to the distal end portion of the second arm 12 can be increased.

Further, according to this embodiment, the pulleys (31, 33, 40A, 40C, 41, and 43), the belts (32, 40B, and 42) (further, the shaft 44), and the like are provided inside the second arm 12. Further, there is no limitation that may be imposed by the routing of the wirings for a motor or the like on the outside of the second arm 12. Thus, the swiveling operation by 90° (workpiece conveyance operation) of the first arm 11 and the second arm 12 within the substantially horizontal plane with respect to the workpiece conveyance direction (feeding direction) is easily carried out.

Further, according to this embodiment, the embodiments in the above-mentioned FOL and EOL can be reliably carried out.

Further, according to this embodiment, the pulleys (31, 33, 40A, 40C, 41, and 43), the belts (32, 40B, and 42) (further, the shaft 44), and the like are provided inside the second arm 12. Further, there is no limitation that may be imposed by the routing of the wirings for a motor or the like on the outside of the second arm 12. Thus, the swiveling operation by 90° of the cross bar CB and the tilting operation can be reliably performed, and further, posture control of the workpieces into a posture of an inverted V-shape as viewed in the workpiece conveyance direction can be stably achieved.

Further, according to this embodiment, through the employment of the inside-conveying-arm structure in which the motor configured to drive the cross bar CB to be tilted is arranged adjacent to the swiveling drive motor. Further, the configuration in which the pulleys (31, 33, 40A, 40C, 41, and 43), the belts (32, 40B, and 42) (further, the shaft 44), and the like are provided inside the second arm 12, the thickness of the second arm 12 in the substantially vertical direction (up-and-down direction) can be reduced. Thus, when the second arm 12 enters the die that moves up and down in the press machine, a fear in that the second arm 12 interferes with the die or the like can be reduced. Therefore, this embodiment is capable of contributing to increase in processing speed of the press machine as well as line speed.

Further, according to this embodiment, the tilt drive motor 40 is arranged in the recessed portion 23 in the vicinity of the swivel drive motor 30. In addition to the above-mentioned effect, the thickness in the vertical direction (the up-and-down direction and the vertical direction) of the part entering the die that moves up and down in the press machine can be reduced. Thus, a fear of interference with the die or the like can be eliminated. Thus, this embodiment is capable of contributing to increase in processing speed of the press machine as well as production speed of the line.

Incidentally, in the description above, the case of processing the workpieces W arranged in parallel in the workpiece-conveyance lateral direction is exemplified. However, the present invention is not limited thereto, and may be applied to a case of conveying a single workpiece.

Figure 17:
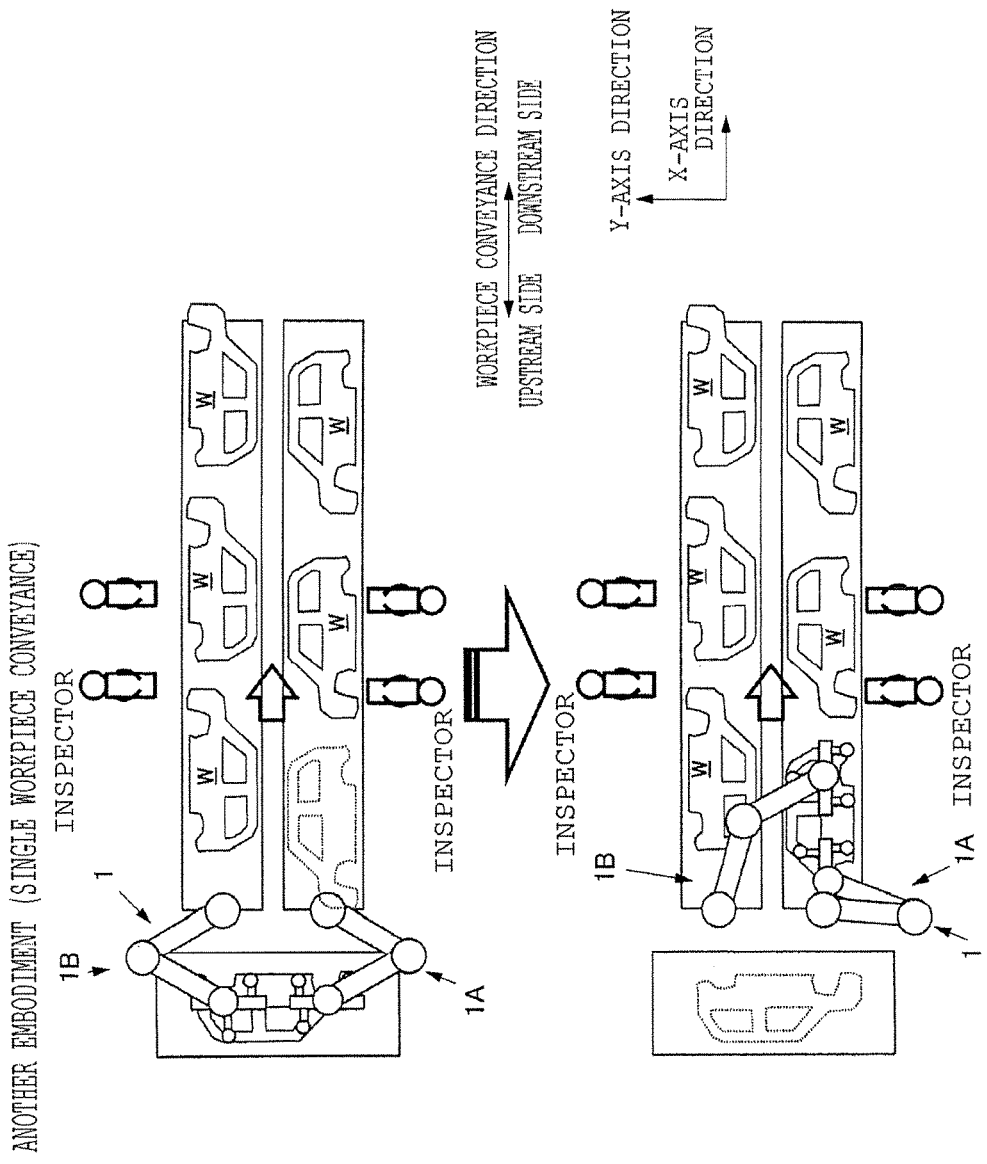
FIG. 17 is an explanatory top view for illustrating an example of a conveyance operation through single-workpiece conveyance by the workpiece conveying apparatus according to the embodiment.
Figures 18A, 18B:
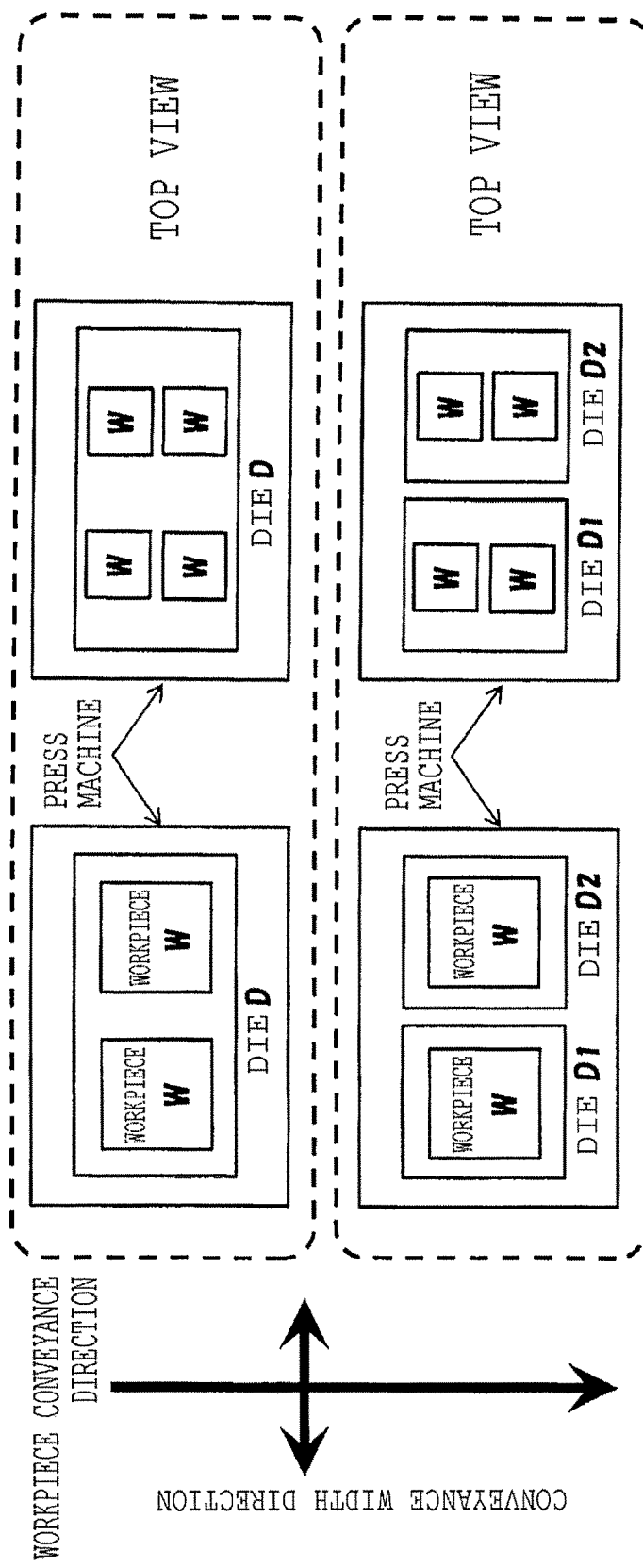
FIG. 18A is a top view for illustrating an example case in which the plurality of workpieces W are conveyed in parallel in a tandem press line (case in which one die D is installed in one pressing machine, and the plurality of workpieces are set in the die D).
FIG. 18B is a top view for illustrating another example case (case in which two dies D (D1 and D2) are installed in one pressing machine).
Figure 19:
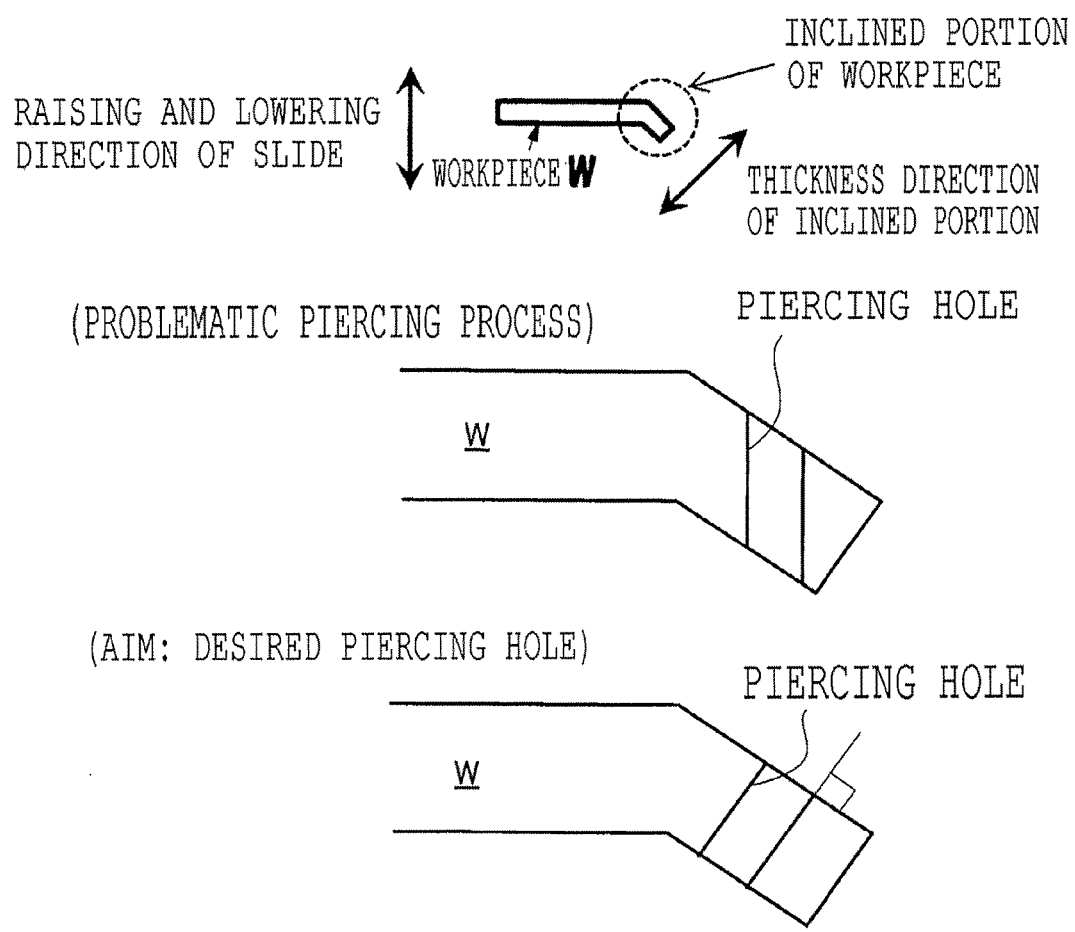
FIG. 19 is an explanatory view for illustrating a problem and a desired piercing hole in a case in which a piercing hole (opening) is formed in the inclined portion of the workpiece through a piercing process (hole forming process using a punch and a die).

For example, in the present invention, in a case of conveying a large-sized single workpiece W that has been processed as illustrated in FIG. 17, as in the upper part of FIG. 17, from a state in which the large-sized single workpiece W is held by the SCARA robots 1A and 1B, the cross bar CB is controlled so as to be driven to swivel while changing the degree of extension of the one conveying arm (SCARA robot) 1A and another conveying arm (SCARA robot) 1B (see the lower part of FIG. 17). In this manner, the workpiece can be conveyed (carried out) from the die onto the conveyor while changing the workpiece posture to a workpiece posture for enhancing the product inspection efficiency (the direction of the workpiece to a direction which can be easily inspected by an inspector).

Further, in the above-mentioned embodiment, the case in which the SCARA robots 1A and 1B are arranged in parallel in the workpiece-conveyance width direction is exemplified. However, the present invention is not limited thereto, and may be applied to a case of performing the workpiece conveyance by only one of the SCARA robots 1A and 1B.

As described above, according to the present invention, it is possible to provide the workpiece conveying apparatus for a pressing machine capable of, with the relatively simple, low-cost, lightweight, and compact configuration, changing the posture of the workpiece with the high degree of freedom.

The embodiment described above is merely an example for describing the present invention, and various modifications may be made without departing from the gist of the present invention.

What is claimed is:

1. A workpiece conveying apparatus for a pressing machine, comprising:
   a first arm supported at a proximal end side thereof through intermediation of a first joint so as to be freely rotatable within a substantially horizontal plane;
   a second arm supported at a proximal end side thereof on a distal end side of the first arm through intermediation of a second joint so as to be freely rotatable within the substantially horizontal plane;
   a workpiece holding device, which is supported on a distal end side of the second arm through intermediation of a third joint so as to be freely rotatable within the substantially horizontal plane, and is configured to releasably hold the workpiece;
   a first arm drive mechanism, which is configured to drive the first arm to rotate about the first joint;
   a second arm drive mechanism, which is configured to drive the second arm to rotate about the second joint with respect to the first arm;
   a workpiece holding device rotation drive mechanism, which is configured to drive the workpiece holding device to rotate about the third joint with respect to the second arm; and
   a tilt drive mechanism, which is configured to drive the workpiece holding device to rotate about a long axis of the workpiece holding device through intermediation of a fourth joint with respect to the distal end of the second arm.

2. A workpiece conveying apparatus for a pressing machine according to claim 1,
   wherein an electric motor being a drive source of the workpiece holding device rotation drive mechanism is mounted to the vicinity of the second joint, and
   wherein a transmission system of a driving force from the electric motor to the workpiece holding device is accommodated on an inner side of the second arm.

3. A workpiece conveying apparatus for a pressing machine according to claim 1,
   wherein an electric motor being a drive source of the tilt drive mechanism is mounted to the vicinity of the second joint, and
   wherein a transmission system of a driving force from the electric motor to the workpiece holding device is accommodated on an inner side of the second arm.

4. A workpiece conveying apparatus for a pressing machine according to claim 1, wherein the workpiece is placed to a downstream step by the tilt drive mechanism under a state in which a workpiece holding surface of the workpiece holding device is inclined with respect to the substantially horizontal plane.

* * * * *